United States Patent
Shear et al.

(10) Patent No.: US 12,007,023 B2
(45) Date of Patent: Jun. 11, 2024

(54) BELT FOR CONTINUOUSLY VARIABLE TRANSMISSION

(71) Applicant: SRI INTERNATIONAL, Menlo Park, CA (US)

(72) Inventors: Riley Shear, Menlo Park, CA (US); Alexander Kernbaum, Sunnyvale, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 17/766,595

(22) PCT Filed: Nov. 20, 2019

(86) PCT No.: PCT/US2019/062486
§ 371 (c)(1),
(2) Date: Apr. 5, 2022

(87) PCT Pub. No.: WO2021/101541
PCT Pub. Date: May 27, 2021

(65) Prior Publication Data
US 2024/0102537 A1 Mar. 28, 2024

(51) Int. Cl.
*F16H 9/16* (2006.01)
*F16G 1/24* (2006.01)
(Continued)

(52) U.S. Cl.
CPC .............. *F16H 9/16* (2013.01); *F16G 3/003* (2013.01); *F16G 13/04* (2013.01); *F16G 1/24* (2013.01);
(Continued)

(58) Field of Classification Search
CPC .. F16H 49/001; F16H 55/56; F16H 61/66272; F16H 37/0846; F16H 55/0833;
(Continued)

(56) References Cited

U.S. PATENT DOCUMENTS 3,516,296 A * 6/1970 Detwiler ............... F16H 63/067
474/23
3,726,158 A * 4/1973 Brown ..................... F16H 1/32
475/167
(Continued)

FOREIGN PATENT DOCUMENTS

JP H08-507849 A 8/1996
JP 2019-504261 A 2/2019
(Continued)

OTHER PUBLICATIONS

International Search Report and Written Opinion dated Jan. 17, 2020 for International Application No. PCT/US2019/062486, 12 pages.

*Primary Examiner* — Henry Y Liu
(74) *Attorney, Agent, or Firm* — McDonnell Boehnen Hulbert & Berghoff LLP

(57) ABSTRACT

A variety of transmission mechanisms are provided that include split pulleys nested within each other in order to reduce the size of the transmissions, to provide infinitely variable transmission ratios that include forward and reverse ratios, or to provide some other benefits. These transmissions include "W"-shaped belts, having both contact surfaces that are directed outward from the belt and inward, toward a center-line of the belt, to contact the pulleys with respective different inward- and outward-directed contact surfaces. Accordingly, the surfaces at which the belt contacts the different pulleys may be substantially the same with respect to a hinge or other structure of the belt. This improvement may permit higher levels of power transmission, increased efficiency, and increased transmission lifetime. Additionally, variable-eccentricity variable transmis- (Continued)

sions are provided wherein the eccentricity of rotation of an inner, nested pulley varies with changes in the transmission ratio of the transmission.

20 Claims, 18 Drawing Sheets

(51) Int. Cl.
*F16G 3/00* (2006.01)
*F16G 13/04* (2006.01)
*F16H 37/08* (2006.01)
*F16H 61/28* (2006.01)

(52) U.S. Cl.
CPC .... *F16H 37/082* (2013.01); *F16H 2061/2869* (2013.01)

(58) Field of Classification Search
CPC ..... F16H 9/16; F16H 9/18; F16H 1/32; F16H 63/067; F16H 2049/006; F16H 37/08
USPC ............................ 474/8, 82; 74/640; 475/162
See application file for complete search history.

(56) References Cited

U.S. PATENT DOCUMENTS

| | | | | |
|---|---|---|---|---|
| 4,056,987 A * | 11/1977 | Hoffmann | ................. | F16H 9/12 475/210 |
| 4,274,295 A * | 6/1981 | Grube | ..................... | F16H 55/56 474/43 |
| 4,453,701 A * | 6/1984 | Huggett | ............... | B66D 1/7421 254/371 |
| 4,689,036 A * | 8/1987 | Love | ................... | F16H 61/6625 474/19 |
| 4,869,705 A * | 9/1989 | Fenton | ................. | F16H 63/067 474/8 |
| 5,050,457 A * | 9/1991 | Takayama | ............. | F16H 63/062 474/70 |
| 6,383,102 B1 * | 5/2002 | Onogi | ............... | F16H 61/66272 474/18 |
| 6,398,680 B1 * | 6/2002 | Onogi | ............... | F16H 61/66272 474/30 |
| 6,926,632 B2 * | 8/2005 | Brown | ..................... | F16H 9/16 474/8 |
| 8,894,520 B2 * | 11/2014 | Labbe | .................... | F16H 55/56 474/19 |
| 10,851,887 B2 * | 12/2020 | Hagihara | ................ | F16H 61/32 |
| 2002/0019280 A1 * | 2/2002 | Brown | ..................... | F16H 9/16 474/8 |
| 2002/0183144 A1 * | 12/2002 | Crewe | ........................ | F16H 9/26 474/8 |
| 2007/0101820 A1 * | 5/2007 | Bulatowicz | ........... | F16H 49/001 74/640 |
| 2007/0105671 A1 * | 5/2007 | Binello | .................... | F16H 55/56 474/19 |
| 2010/0272571 A1 * | 10/2010 | Yonge | ....................... | B62M 9/08 474/49 |
| 2011/0154928 A1 * | 6/2011 | Ishikawa | .............. | F16H 55/0833 74/461 |
| 2013/0112806 A1 * | 5/2013 | Walitzki | ................ | B64C 25/405 244/50 |
| 2014/0206488 A1 * | 7/2014 | Yeh | ............................ | F16H 1/32 475/162 |
| 2014/0256495 A1 * | 9/2014 | Waide | ................... | F16H 49/001 475/167 |
| 2015/0024882 A1 * | 1/2015 | Ochab | ................... | F16H 63/067 474/19 |
| 2015/0075310 A1 * | 3/2015 | Lunin | .................... | F16H 49/001 74/412 R |
| 2015/0105194 A1 * | 4/2015 | Sumida | ...................... | F16G 5/16 474/28 |
| 2015/0107387 A1 * | 4/2015 | Kuo | ....................... | F16H 49/001 74/412 R |
| 2015/0354686 A1 * | 12/2015 | Balsiger | ................. | H02K 7/116 74/640 |
| 2016/0010701 A1 * | 1/2016 | Balsiger | ................. | F16D 27/108 74/405 |
| 2016/0047452 A1 * | 2/2016 | Jensen | .................. | F16H 49/001 74/640 |
| 2018/0038467 A1 * | 2/2018 | Balsiger | ................. | B64C 13/34 |
| 2018/0038468 A1 * | 2/2018 | Balsiger | ................. | F16H 49/001 |
| 2018/0112760 A1 * | 4/2018 | Balsiger | ................. | B64C 13/34 |
| 2018/0119789 A1 * | 5/2018 | Ito | ............................ | F16H 55/38 |
| 2018/0320766 A1 * | 11/2018 | Kernbaum | ............ | F16H 55/563 |
| 2018/0372205 A1 * | 12/2018 | Preuss | ................... | F16H 49/001 |
| 2019/0264791 A1 * | 8/2019 | Atmur | ................... | F16H 49/001 |
| 2020/0040981 A1 * | 2/2020 | Zhao | ....................... | F16C 23/082 |

FOREIGN PATENT DOCUMENTS

| | | |
|---|---|---|
| WO | 2014006744 A1 | 1/2014 |
| WO | 2017006914 A1 | 1/2017 |
| WO | WO 2018/187271 | 11/2018 |

* cited by examiner

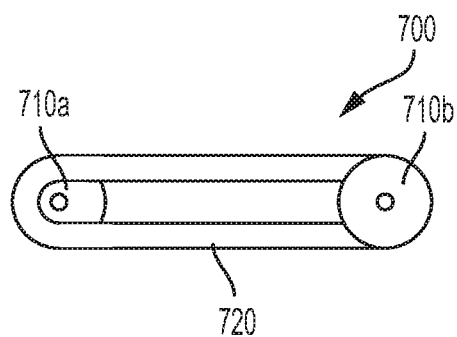 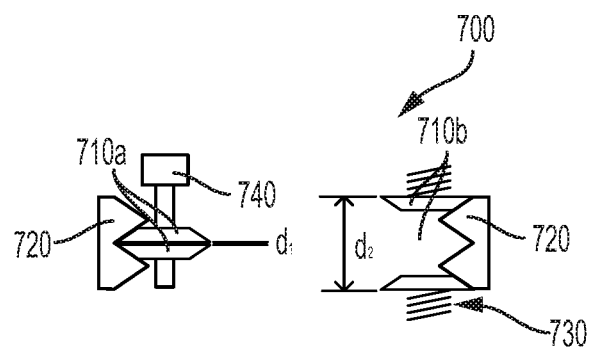
FIG. 7A  FIG. 7B
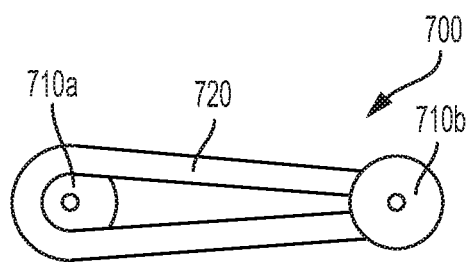 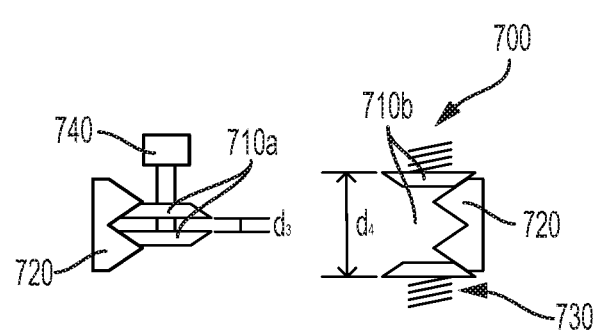
FIG. 7C  FIG. 7D

BELT FOR CONTINUOUSLY VARIABLE TRANSMISSION

BACKGROUND

Unless otherwise indicated herein, the materials described in this section are not prior art to the claims in this application and are not admitted to be prior art by inclusion in this section.

Transmissions are included as part of a variety of mechanisms in order to provide a mechanical advantage between an input torque and an output torque. Thus, a transmission may be included to match properties of a motor, engine, turbine, or other torque generator (e.g., a torque-speed curve, an efficiency curve) to properties of an effector, a wheel, a generator, or some other intended application for a generated torque. For example, a transmission may be provided in an automobile to match the high rotational speed and relatively lower torque generated by an internal combustion engine to lower speed and higher torque requirements for driving the wheels of the automobile. In another example, a transmission may be provided to couple an internal combustion engine to a generator such that both the internal combustion engine and the generator are operated according to respective efficient rotational speeds.

A transmission may have a set transmission ratio (the ratio of the rotation speed and/or applied torque at an input of the transmission to the rotation speed and/or delivered torque at an output of the transmission) or may have a controllable transmission ratio. The transmission ratio of such a transmission may be controllable via electronic, mechanical, hydraulic, and/or other methodologies (e.g., via actuation of a clutch, slidable gear(s), split pulley, drum, turbine vane(s), hydraulic valve(s), or other elements of the transmission by a motor, solenoid, or other methodologies). In some examples, a transmission may have a discrete number of selectable transmission ratios (or "gears") that can be selected by operating one or more clutches or other actuators. In other examples, a transmission may have a transmission ratio that is continuously controllable across a range of transmission ratios; such transmissions may be referred to as "continuously variable transmissions." Such variable transmissions may include split pulleys, toroidal drums, hydrostatic elements, or other actuatable components to permit continuous control of the transmission ratio across the range of transmission ratios.

A differential is a device that permits the distribution of an applied torque and/or rotation across multiple different outputs and/or the combination of multiple different applied torques and/or rotations to a single output. A differential may be configured in a variety of ways to provide a specified distribution of torques/rotations between the input(s) and output(s) of the differential. For example, a differential in an automobile may receive an input torque from the engine of the automobile and distribute that input torque to two wheels (e.g., two front wheels or two back wheels) of the automobile equally, such that equal force is provided against the ground by both wheels when the automobile is turning, even though opposite wheels may undergo unequal rotations during a turn.

SUMMARY

A variable transmission can include multiple split pulleys connected via a belt. By controlling the axial distance between half-pulleys of the split pulleys, the effective diameters at which the belt engages with the split pulleys can be adjusted, thus changing the overall transmission ratio of the transmission. To reduce the size of the transmission, to provide a range of transmission ratios that includes both forward and reverse ratios, or to provide other benefits, one of the split pulleys (an 'inner split pulley') may be nested within the other split pulley (an 'outer split pulley'). In such configurations ('nested-pulley' configurations), the inner pulley in such a transmission typically engages in trochoidal motion within the transmission, rotating about an axis of rotation that, itself, orbits about a central axis of rotation of the transmission at a specified distance from the central axis of rotation. The inner split pulley of such a transmission could be driven by an input member (e.g., via an off-center cam), and power can be extracted from the inner split pulley via an offset shaft coupling or some other mechanism.

Variable transmissions often include a belt for transmitting forces and/or torques between pulleys (e.g., split-pulleys) of the transmission. Such belts may have a 'v'-shaped cross-section (which may also be referred to as a wedge-shape, trapezoid-shape, or triangle-shape) and contact the pulleys at contact surfaces that face outward from the center of the wedge-shaped cross section. In embodiments wherein the pulleys are offset from each other by enough distance that they are not nested within each other, such a v-belt can contact the pulleys with substantially the same contact surfaces. That is, the portions of the outward-facing surfaces of the v-belt that come into contact with one of the pulleys are substantially the same portions of the outward-facing surfaces of the v-belt that come into contact with the other pulley.

However, in nested-pulley transmissions and other types of transmissions, a v-belt may contact different pulleys of the transmission with different surface portions of the v-belt. This can result in uneven wear to the belt and/or pulleys, slipping of the belt against one or both of the pulleys, reduced power and/or torque capacity, increased torque-dependence of efficiency or other properties of the transmission, or other undesired effects. Some of these effects may be related to the different surfaces of the belt at which the belt contacts the different pulleys differing with respect to location relative to a hinge, pitch line, or other characteristic location of flexion of the belt.

To address these issues, a belt may be employed that has multiple sets of contact surfaces, with some of the contact surfaces being inward-facing (e.g., to contact outward-facing contact surfaces of an inner split-pulley) and some of the contact surfaces being outward-facing (e.g., to contact inward-facing contact surfaces of an outer split-pulley). Such a belt may be said to have a 'w'-shaped cross section. Such a w-belt, having opposite-facing sets of contact surfaces for contacting different pulleys of a transmission, may be configured such that the inward- and outward-facing contact surfaces have similar relationships to a hinge, pitch line, or other characteristic location of flexion of the belt. Use of such a W-belt may reduce and/or balance wear on the belt and/or pulleys, increase the power and/or torque capacity of the transmission, and/or provide other benefits.

Some embodiments of the present disclosure provide a transmission having a reduced size, the transmission including: (i) an outer conical pulley; (ii) an inner conical pulley; (iii) a belt, wherein the belt has first and second outward-facing contact surfaces and first and second inward-facing contact surfaces, wherein the belt is in contact with the outer conical split pulley via the first and second outward-facing contact surfaces, wherein the belt is in contact with the inner conical pulley via the first and second inward-facing contact surfaces, wherein the belt is capable of sustaining compression forces between the first and second outward-facing contact surfaces, and wherein the belt is capable of sustaining tension forces between the first and second inward-facing contact surfaces; (iv) a first input member; and (v) a first output member coupled to the first input member via the inner conical pulley such that torque can be transmitted between the first input member and the first output member.

Some embodiments of the present disclosure provide a transmission having a reduced size and a controllable transmission ratio for increased efficiency, the transmission including: (i) an outer conical split pulley having a first half-pulley and a second half-pulley; (ii) an inner conical split pulley having a first half-pulley and a second half-pulley; (iii) a belt, wherein the belt has first and second outward-facing contact surfaces and first and second inward-facing contact surfaces, wherein the belt is in contact with the first and second half-pulleys of the outer conical split pulley via the first and second outward-facing contact surfaces, respectively, and wherein the belt is in contact with the first and second half-pulleys of the inner conical split pulley via the first and second inward-facing contact surfaces, respectively; (iv) a first input member; and (v) a first output member coupled to the first input member via the inner conical split pulley such that torque can be transmitted between the first input member and the first output member.

Some embodiments of the present disclosure provide a variable transmission including: (i) an input member that rotates about a central axis; (ii) an inner pulley that rotates about an inner pulley axis, wherein an eccentricity of the rotation of the inner pulley, relative to the central axis, is adjustable to control a transmission ratio of the transmission; (iii) an outer conical split pulley having a first half-pulley and a second half-pulley; (iv) a belt, wherein the belt is in contact with the inner pulley, and wherein the belt is in contact with the first and second half pulleys of the outer conical split pulley via respective first and second contact surfaces of the belt; and (v) an output member, wherein the output member is coupled to the inner pulley such that precession of the inner pulley axis around the central axis results in rotation of the output member.

These as well as other aspects, advantages, and alternatives, will become apparent to those of ordinary skill in the art by reading the following detailed description, with reference where appropriate to the accompanying drawings. Note that, when used herein to identify pulleys of a transmission, the words 'inner' and 'outer' are applied to facilitate identification of elements of the transmission and are intended to have meanings broader than their ordinary meanings. An 'inner' pulley need not be wholly contained within (e.g., with respect to their respective outer circumferences) an 'outer' pulley. An 'inner' pulley need not be 'more' enclosed than an 'outer' pulley. Indeed, the diameters and degree of relative overlap of 'inner' and 'outer' pulleys of a transmission as described herein may be identical. An 'inner' pulley of a transmission as described herein may extend beyond an outer circumference of an 'outer' pulley of the transmission.

BRIEF DESCRIPTION OF THE DRAWINGS

FIG. 7A is a side view of an example variable transmission.
FIG. 7B is a top view of the variable transmission shown in FIG. 7A.
FIG. 7C is a top view of the variable transmission shown in FIG. 7A, after having undergone a shift in transmission ratio.
FIG. 7D is a top view of the variable transmission shown in FIG. 7C.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. EXAMPLE BELTS FOR TRANSMISSIONS

Transmissions as described herein may include belts to transmit forces and/or torques between pulleys (e.g., split pulleys) of the transmissions. Such belts may be configured in a variety of ways and composed of a variety of materials. For example, a belt could be composed of a single, solid piece of flexible material (such that the belt has portions that undergo repeated compression and/or tension as the belt flexes), rigid segments (e.g., plates, distinct formed volumes of a bulk material of the belt) held together by hinges or other components to permit flexion of the overall belt, or other components or materials.

The belt may include one or more internal belts or bands to provide increased rigidity along the length of the belt (e.g., to reduce the longitudinal flexibility of the belt and thus to increase the efficiency of the transmission) while permitting the belt to flex in other directions (e.g., to allow the belt to conform to a pulley in order to transmit forces between the pulley and the belt). Such a belt may be embedded within a rubber or other solid material of the belt, may pass through holes or other corresponding features of rigid plates or other segmented components of the belt, or may be incorporated into the belt in some other manner. Additionally or alternatively, the belt may include a plurality of hinges (e.g., four-bar hinges, hinges formed into a bulk material of the belt) to allow segments (e.g., plates, distinct formed volumes of a bulk material of the belt) of the belt to flex in in one or more directions perpendicular to the length of the belt while allowing the belt to transmit forces along the length of the belt.

Figure 1A:
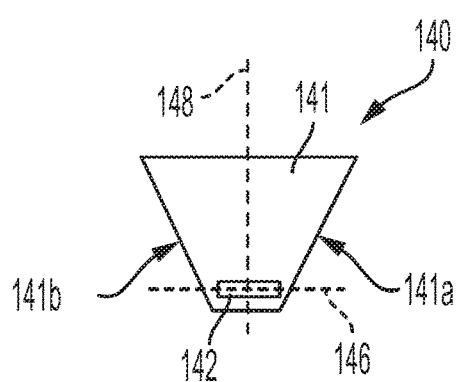
FIG. 1A is a cross-sectional view of elements of a belt.
Figure 1B:
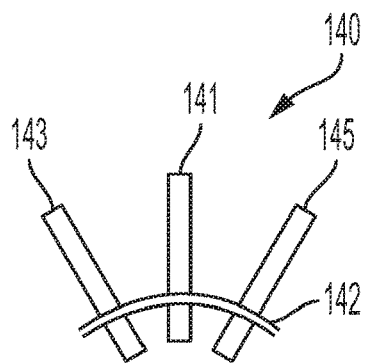
FIG. 1B is another cross-sectional view of the belt depicted in FIG. 1A.

FIGS. 1A and 1B show, in first and second cross-sectional views, elements of a v-shaped belt 140. Such v-shaped belts have been applied in a variety of transmissions or other mechanisms, including variable transmissions, in the past. The belt 140 includes a plurality of segments (e.g., trapezoidally-shaped metal plates) that includes first 141, second 143, and third 145 segments. The segments (e.g., 141, 143, 145) are connected together by a band 142. The band 142 may be composed of metal, polymers, or other materials or combinations of materials (e.g., a composite material including carbon fibers and a binding agent) and may be formed from a single piece of material (e.g., a cast loop of rubber), a plurality of fibers or wires (e.g., a woven metal band), or be formed from some otherwise-configured pieces of material.

FIG. 1A shows a cross-section through the first segment 141 in a plane that is perpendicular to the length of the belt (i.e., the direction along which the belt can transmit tension). FIG. 1B shows a cross-section through the middle of the belt in the plane in which the belt is configured to flex, e.g., as it comes into contact with curved contact surfaces of pulleys of a transmission in order to allow the belt to transmit forces between the belt and the pulleys. This middle plane is illustrated in FIG. 1A as dashed line 148 and may be referred to as the "center line" of the belt 140.

Note that the belt 140 shown in FIGS. 1A and 1B is intended as a non-limiting example of a belt that could be employed in a transmission as described herein. A belt for such use may include a plurality of discrete segments, may include a plurality of segments formed from a single continuous piece of material (e.g., by being cast to have such a shape), may by formed from a single piece of material having a non-segmented shape, or may have some other shape or configuration. Such a belt may include a single internal band, multiple internal bands, or no internal bands. Such a belt may additionally or alternatively include hinges (e.g., four-bar hinges) to connect segments of the belt together, to allow the belt to flex in a direction perpendicular to a length of the belt, and to allow the belt to transmit forces along the length of the belt (e.g., by controlling an effective rigidity of the belt along the length of the belt).

As illustrated in FIG. 1A, the belt 140 has a trapezoidal cross-sectional shape in the plane perpendicular to the length of the belt. The belt 140 includes first 141a and second 141b contact surfaces for making contact with, and transmitted forces to/from, corresponding contact surfaces of pulleys of a transmission (e.g., split pulleys). These contact surfaces are directed outward from each other and from the center line 148 of the belt 140. Such a belt, having two opposite, outward-facing contact surfaces may be referred to as a v-belt, v-shaped, or wedge-shaped.

As the band 142 of the belt 140 is the element that, during normal operation, transmits forces along the length of the belt 140, the segments (e.g., 141, 143, 145) of the belt 140 tend to rotate, relative to each other and relative to the long axis of the belt 140, about an axis 146 (that may be referred to as a "pitch line") that passes through the band 142. Such an axis, in alternatively-configured belts, may be located at an effective axis of a hinge or at some other feature of the belt that transmits forces along the length of the belt but that is more flexible in direction(s) perpendicular to the length of the belt in order to allow the belt to flex in those direction(s). To increase the stability of the belt 140, this axis 146 may be placed nearer the inside of the belt 140, e.g., within all of the portions of the belt 140 that are likely to contact pulleys of a transmission.

Such a belt, having contact surfaces that are outward-facing with respect to each other and/or to a center line of the belt, could be used in a nested-pulley transmission as described previously.

Figure 2A:
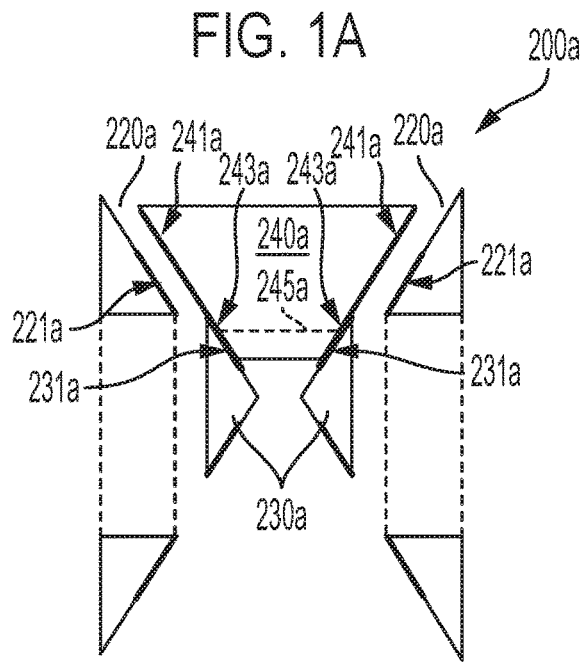
FIG. 2A is a cross-sectional view of elements of an example variable transmission.

FIG. 2A shows, in cross-section, elements of such a transmission 200a. The transmission 200a includes an inner split-pulley 230a, an outer split pulley 220a, and a belt 240a. The belt 240a has outward-facing contact surfaces 241a, 243a via which the belt 240a contacts contact surfaces 221a of the outer split pulley 220a and contact surfaces 231a of the inner split pulley 230a, respectively. The outward-facing contact surfaces 241a, 243a of the belt 240a may be distinct outward-facing surfaces of the belt 240a. Alternatively, the contact surfaces 241a, 243a of the belt 240a may be overlapping and/or coextensive. The belt 240a has an effective pitch line 245a about which segments (e.g., metal plates) or other local portions of the belt 240a flex when the belt 240a comes into contact with one of the split pulleys 220a, 230a.

As shown in FIG. 2A, the configuration of a transmission (e.g., 200a) in this manner may result in different portions of the outward-facing surface of a belt contacting the inner and outer pulleys of the transmission. As a result, the portions of the belt that contact the inner and outer pulleys may also differ with respect to distance from the axis of flexion or pitch line of the belt. This can lead, especially under conditions of heavy load, to the belt engaging with the inner and/or outer pulleys in an unwanted manner and/or in a manner that differs between the inner and outer pulleys. This can result in a reduction in the torque/power capacity of the transmission and/or to the transmission having a larger size/volume for a given torque/power rating.

For example, high loads or other conditions could result in segments of the belt engaging with the outer pulley at undesirable angles, e.g., at angles substantially deviating from an angle perpendicular to the length of the belt as is curves around a pulley. This may be due to the line of tension through the pitch line (e.g., through a steel band of the belt) being at a different radius, relative to the direction of flexion of the belt, than the radii spanned by the contact surfaces of the belt. This can lead to a moment being applied to a segment of the belt, causing the segment to contact the pulley at an undesirable angle, especially at high transmission loads. This and other processes may result in increased wear, increased slippage, reduced device lifetime, reduced load capacity, reduced efficiency, unbalanced wear between inner and outer pulleys, increased minimum bending radius of the belt, lower wrap angles of the belt around a pulley, increased belt tension, or other unwanted effects.

Some of these effects could be reduced by reducing the height of the belt and/or increasing an angle of the contact surfaces relative to the center line of the belt. However, these changes can have unwanted effects of their own, including reduced load capacity, increased transmission size, a reduction in the range of transmission ratios of the transmission, or other unwanted effects.

Another solution is to use a belt having both inward-facing and outward-facing contact surfaces. Such a belt, having at least two inward-facing contact surfaces and at least two outward-faces contact surfaces, may be referred to as a w-shaped belt or a w-belt. These different sets of contact surfaces could be configured to contact inner and outer pulleys, respectively, of the transmission. By contacting a first pulley (e.g., an inner pulley) with inward-facing contact surfaces and contacting a second pulley (e.g., an outer pulley) with outward-facing contact surfaces, the inward- and outward-facing contact surfaces can have more similar locations (e.g., ranges of radii spanned) to a pitch line (or some other feature) of the belt. Accordingly, such a belt may allow for the reduction of some of the unwanted effects described above relative to a v-shaped or otherwise-configured belt having only outward-facing contact surfaces. Additionally or alternatively, the location of the inward- and outward-facing contact surfaces could be independently specified according to an application (e.g., to adjust a relative rate of wear or other properties between the sets of contact surfaces of the belt and/or the corresponding sets of contact surfaces of pulleys of a transmission).

Such a belt, having contact surfaces that are overlapping with or otherwise near the pitch line of the belt and thus that transmits forces into/from a pulley, sprocket, or other mechanical element near the pitch line, may exhibit reduced slip, increased lifetime, reduced minimum bending radius, increased wrap angle around a pulley, decreased belt tension (related, e.g., to the increased wrap angle), or other beneficial effects. These effects are related to the proximity, in the direction perpendicular to the plane of flexion of the belt, between all of the contact surfaces and the pitch line of the belt. This proximity results in a lowering of the torque generated in the belt (e.g., exerted on individual segments of the belt) by a difference in location between the tension forces transmitted along the belt (e.g., between segments of the belt, by a steel band of the belt) and the location at which forces are transmitted, by contact surfaces, between the belt and a pulley, sprocket, or other element of a mechanism that includes the belt.

Alternatively, some or all of the above benefits can be obtained by using a hybrid belt that includes contact surfaces (e.g., outward-facing contact surfaces) for interacting with certain mechanical elements (e.g., split-pulley(s) of a transmission) and that also includes teeth for interacting with other mechanical elements (e.g., sprockets, toothed or grooved pulleys of a transmission). In such an example, contact surfaces of the teeth of the belt, as well as flat contact surfaces for contacting pulleys or other non-toothed elements, could all be located proximate to the pitch line of the belt. Such a hybrid belt could be employed, e.g., in the transmission 900 illustrated in FIGS. 9A-C and described below.

Figure 2B:
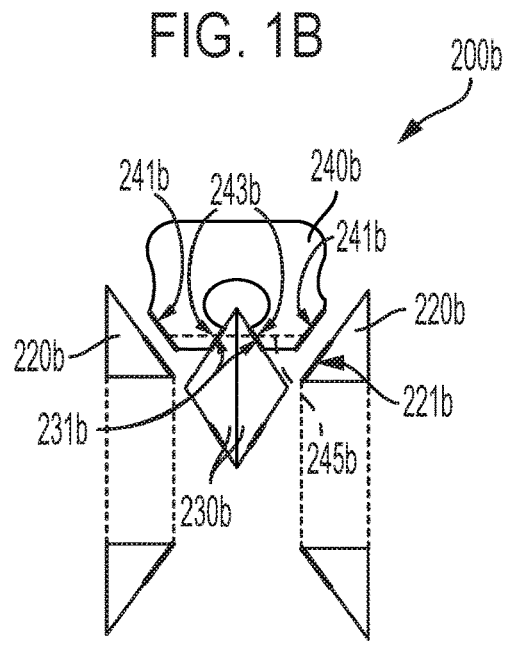
FIG. 2B is a cross-sectional view of elements of an example variable transmission.

FIG. 2B shows, in cross-section, elements of a transmission 200*b* that includes such a w-belt 240*b*. The transmission 200*b* includes an inner split-pulley 230*b*, an outer split pulley 220*b*, and a belt 240*b*. The belt 240*b* has outward-facing contact surfaces 241*b* via which the belt 240*b* contacts contact surfaces 221*b* of the outer split pulley 220*b*. The belt 240*b* also has inward-facing contact surfaces 243*b* via which the belt 240*b* contacts contact surfaces 231*b* of the inner split pulley 230*b*. The belt 240*b* has a pitch line 245*b* about which segments (e.g., metal plates) or other local portions of the belt 240*b* flex when the belt 240*b* comes into contact with one of the split pulleys 220*b*, 230*b*.

As shown in FIG. 2B, the configuration of a transmission (e.g., 200*b*) in this manner allows the inward- and outward-facing surfaces of the belt, via which the belt contacts the inner and outer pulleys of the transmission, to be substantially the same with respect to distance from the axis of flexion of the belt (e.g., to span substantially the same range of distances from the axis of flexion). This can result in the belt engaging with the inner and outer pulleys in a more similar manner across a wider range of load conditions. Alternatively, the location of the inward- and outward-facing contact surfaces can be independently specified (e.g., relative to each other, relative to an axis of flexion or other feature of the belt) according to an application (e.g., to balance wear between inner and outer pulleys of a transmission, to balance a slip force of the belt against an outer pulley with the slip force of the belt against one or more inner pulleys). For example, the location of the inward- and outward-facing contact surfaces can be specified such that the angles at which segments of the belt engage with the inner and outer pulleys may be independently controlled.

Figure 3:
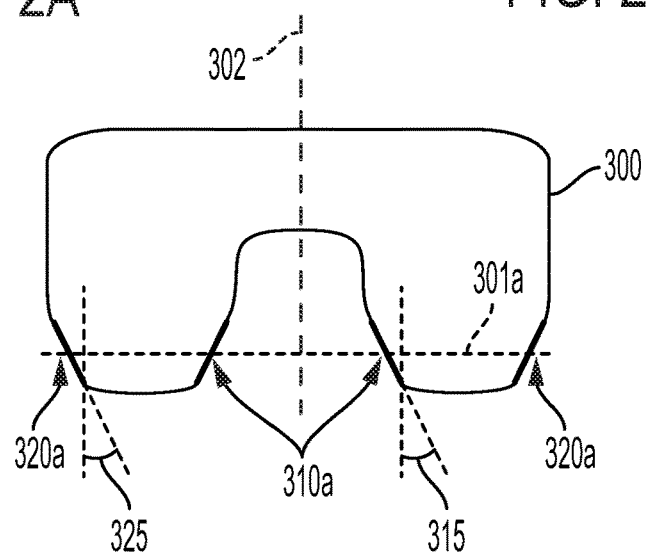
FIG. 3 is a cross-sectional view of elements of a belt.

FIG. 3 depicts a cross-section of an example belt 300 (e.g., a w-belt) as described herein. The plane of the cross-sectional view is perpendicular to the length of the belt. The belt could be composed of a plurality of segments (e.g., FIG. 3 could depict a metal plate segment of the belt) or could be configured in some other way. An axis of flexion or "pitch line" 301*a* and a center line 302 of the belt 300 are depicted. The pitch line 301*a* could be the location at which one or more bands pass through segments of the belt 300, a location of a hinge connecting adjacent segments of the belt (e.g., a location of a link coupling neighboring segments of a chain-style belt), or the location of some other feature of the belt 300.

The belt 300 includes first and second inward-facing contact surfaces 310*a*. The inward-facing contact surfaces 310*a* are oriented at a first angle 315 relative to the center line 302*a* of the belt. The angle 315 of the inward-facing contact surfaces 310*a* could be specified to match an angle of corresponding outward-facing contact surfaces of one or more inner pulleys (e.g., split pulleys) of a transmission. The belt 300 also includes first and second outward-facing contact surfaces 320*a*. The outward-facing contact surfaces 320a are oriented at a second angle 325 relative to the center line 302a of the belt. The angle 325 of the outward-facing contact surfaces 320a could be specified to match an angle of corresponding inward-facing contact surfaces of one or more outer pulleys (e.g., split pulleys) of a transmission. During operation within a transmission or other mechanism, the belt 300 (e.g., individual segments of the belt 300) are configured to sustain compressive forces between the outward-facing contact surfaces 320a and to sustain tension forces between the inward-facing contact surfaces 310a. This can include sustaining such tension and compression forces alternatively across time, e.g., as segments of the belt alternatively come into contact with outer and inner pulleys, respectively, of a transmission. Sustaining such compressive and tension forces includes sustaining forces that are, with respect to any particular belt segment or portion, forces that are overall compressive forces or tension forces. Such forces may result in different tension and compressive forces at different locations within the belt. For example, when the belt 300 is sustaining a compressive force between the outward-facing contact surfaces 320a, a particular portion of the belt 300 that is toward the bottom of FIG. 3 could sustain compressive forces while a particular portion of the belt 300 that is toward the top of FIG. 3 could sustain tension forces (e.g., the middle portion of the belt 300 could sustain a bending moment).

The inward-facing contact surfaces 310a and outward-facing contact surfaces 320a span substantially the same range of radii relative to the pitch line 301a of the belt 300. However, the inward- and outward-facing contact surfaces of a belt as described herein (e.g., a w-belt) could overlap by a lesser degree, or could be completely non-overlapping. The inward- and outward-facing contact surfaces of a belt as described herein could overlap, with respect to the range of radii relative to the pitch line 301a of the belt that they span, by more than 90%, by more than 50%, or by more than 25%.

As shown in FIG. 3, the belt 300 has a cross-section that lacks sharp angles or curves with a small radius of curvature. This can be done to reduce the concentration of strains within the belt 300 (e.g., within individual segments of the belt 300) when the belt 300 is sustaining compressive forces between the outward-facing contact surfaces 320a and/or when the belt 300 is sustaining tension forces between the inward-facing contact surfaces 310a, or to provide some other benefit.

Note that a belt as described herein, having both inward- and outward-facing contact surfaces that may be disposed near to or overlapping the pitch line of the belt, could be applied to transmit forces and/or torques between elements of devices that are not nested-pulley variable transmissions. For example, such belts could be applied in non-variable nested transmissions, non-nested variable transmissions, non-nested non-variable transmissions, or some other mechanism to transmit forces and/or torques between two or more split and/or non-split pulleys. Such belts could be applied in such alternative mechanisms in order to allow the properties of contact (e.g., angle, surface texture, surface contact) between the belt and two or more pulleys to differ between the pulleys or to provide some other benefit.

A W-belt as described herein may be configured to transmit forces between pulleys or other elements of a transmission by transmitting those forces via tension along the length of the belt. Alternatively, the belt could be configured to transmit such forces via compression along the length of the belt, e.g., the belt could be configured as a push-belt. Such an arrangement may provide a variety of benefits, including allowing various performance factors that are affected by tension in the belt (e.g., slippage, chording, unbalanced forces transmitted through the bearings of the transmission) to be at least partially decoupled from the power rating or other factors of the transmission that are related to the ability of the belt to transfer forces along its length (e.g., from an inner pulley to an outer pulley). A belt as described herein (e.g., a W-belt) is well-suited to being configured and used as a push-belt, as such a belt can be configured to have contact surfaces (e.g., inward- and/or outward-facing contact surfaces) that are near or overlapping with the pitch line of the bend, rather than far from the pitch line of the belt.

Figure 4A:
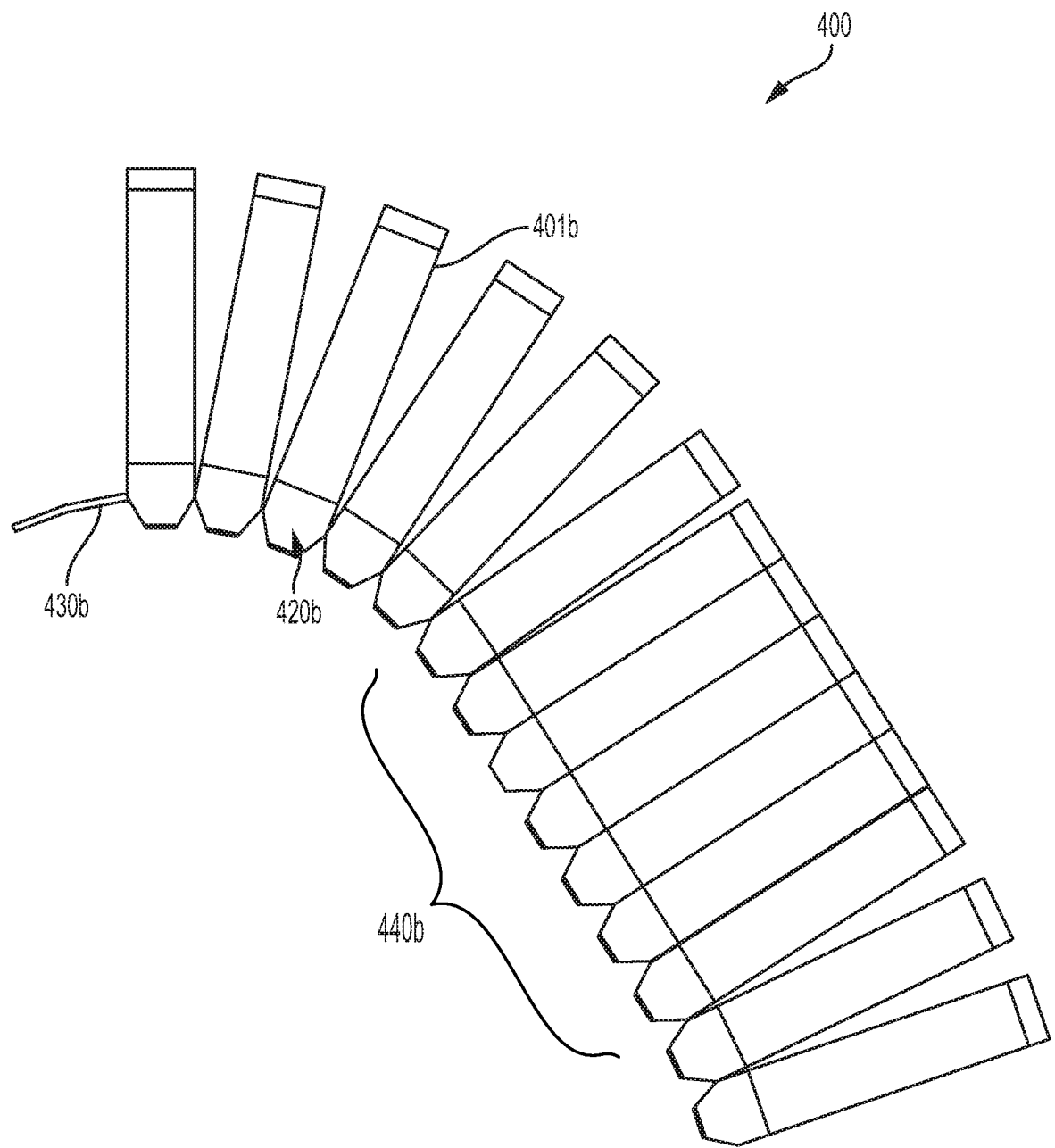
FIG. 4A is a cross-sectional view of elements of a belt.
Figure 4C:
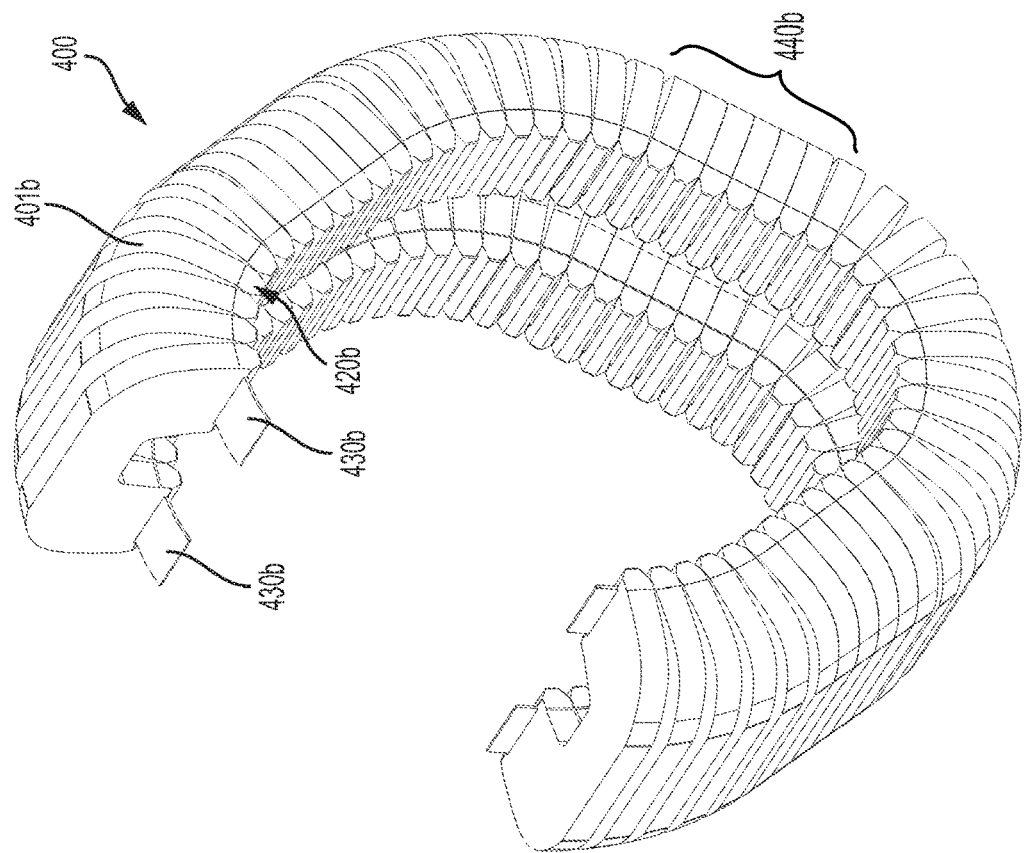
FIG. 4C is a perspective view of elements of the belt shown in FIG. 4A.
Figure 4B:
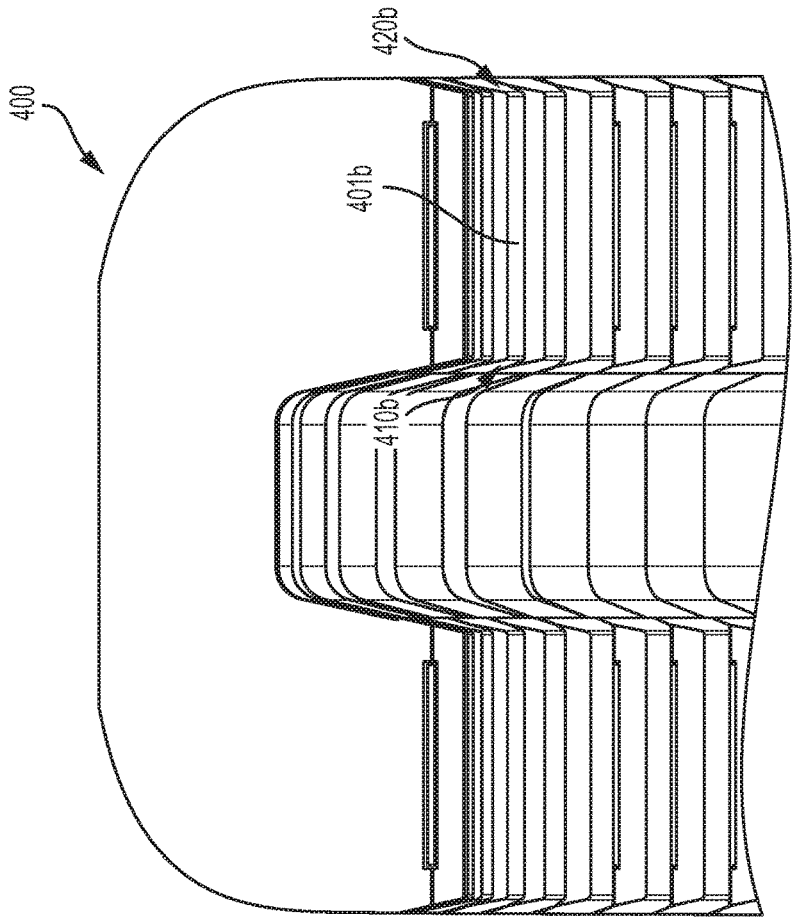
FIG. 4B is a perspective view of elements of the belt shown in FIG. 4A.

FIGS. 4A, 4B, and 4C illustrate elements of such a belt 400 that is configured to transmit forces between pulleys of a transmission, or between other elements of a transmission or other device, via compression along the length of the belt 400. FIG. 4A provides a cross-sectional view and FIGS. 4B and 4C provide perspective views. The belt 400 includes a plurality of plates or other segments (including example segment 401b) that are connected to each other by a band 430b (e.g., one or more steel bands) that can also provide tension along the length of the belt 430b. Each segment includes inward-facing contact surfaces (e.g., 410b), outward-facing contact surfaces (e.g., 420b), or other features (e.g., teeth) for contacting pulleys (e.g., split pulleys) or other elements of a transmission or other mechanism. As shown in FIG. 7A, these contact surfaces can span a range of radii, relative to the direction of flexion of the belt, that overlaps with the radius of the pitch line of the belt. The segments of the belt 400 have shaped surfaces or other features that allow the segments of the belt to stack (e.g., the set of stacked segments 440b) and transmits forces along the belt via compression.

Figure 5A:
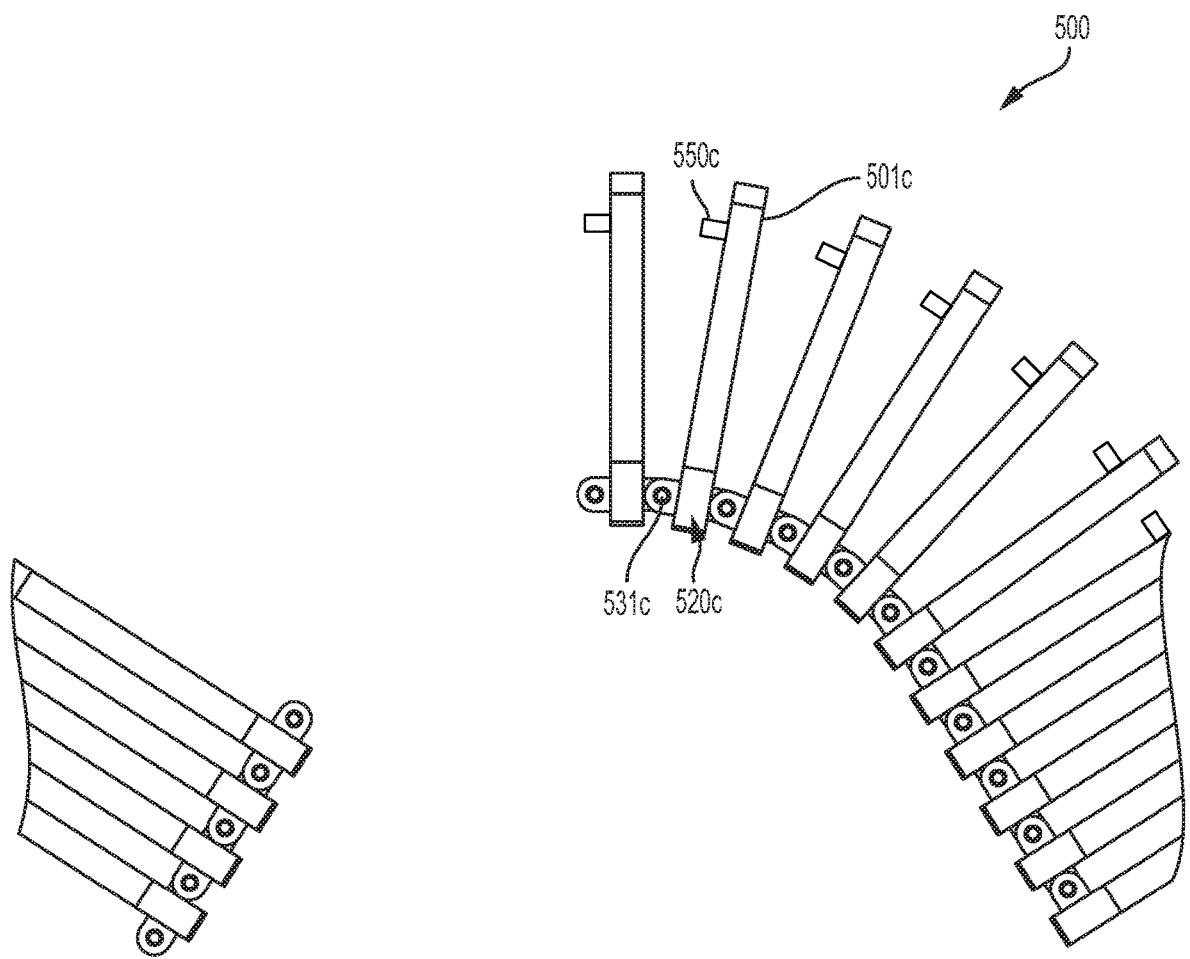
FIG. 5A is a cross-sectional view of elements of a belt.
Figure 5C:
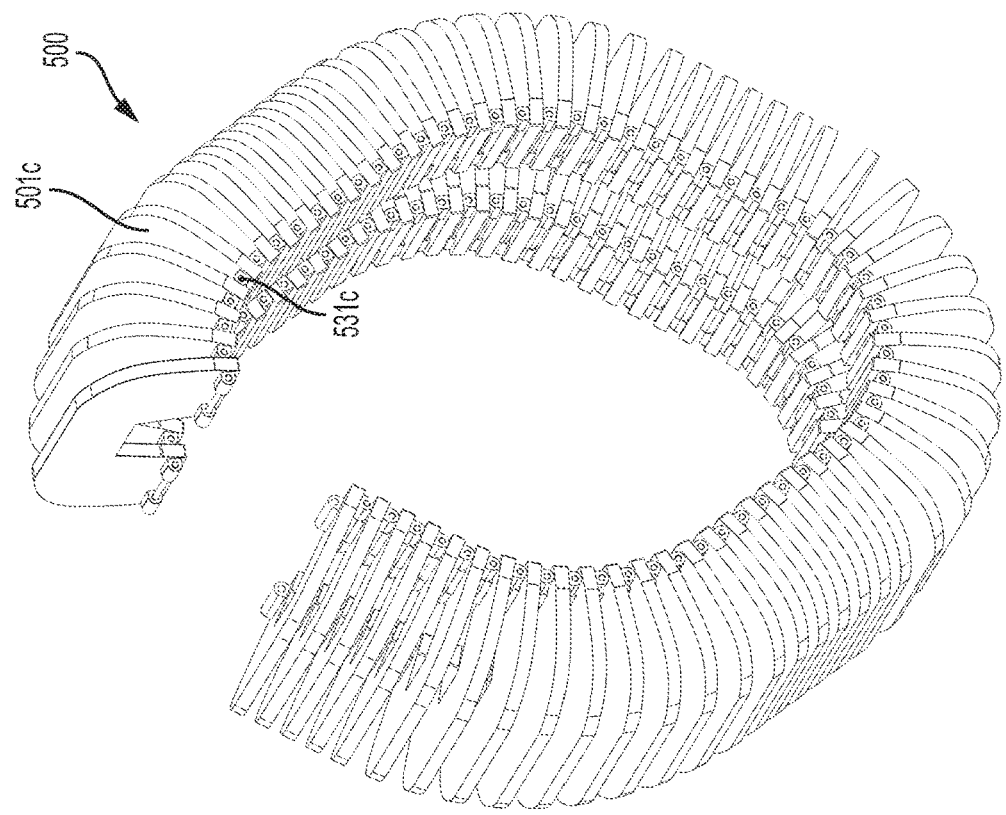
FIG. 5C is a perspective view of elements of the belt shown in FIG. 5A.
Figure 5B:
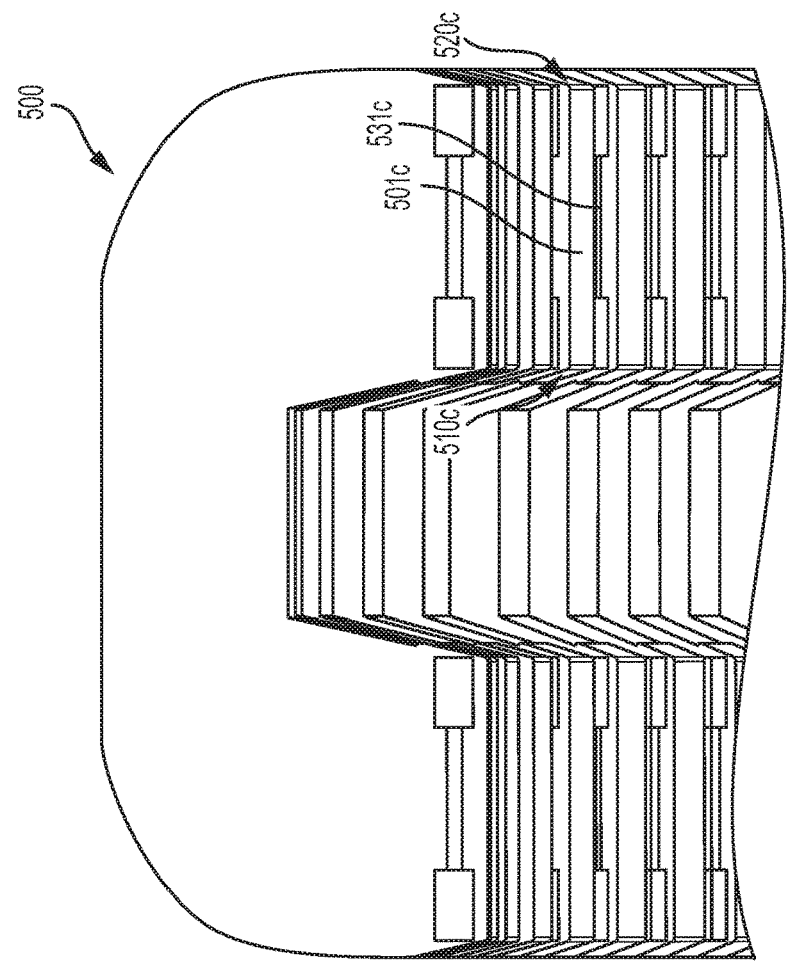
FIG. 5B is a perspective view of elements of the belt shown in FIG. 5A.

As shown in, e.g., FIGS. 4A-C, a belt as described herein may include a plurality of segments connected via one or more straps. However, segments of a multi-segment belt as described herein may be coupled together via additional or alternative methods. For example, such a belt could be configured as a chain-style belt, with each segment of the belt coupled to its neighbors via one or more cylindrical or otherwise-shaped pins. Each segment or link of such a belt could be shaped to have inward-facing and outward-facing contact surfaces, teeth, or some other features for contacting and transmitting force into/out of pulleys, sprockets, or other elements of a transmission or other mechanism. FIGS. 5A, 5B, and 5C illustrate elements of such a chain-style belt 500 that is configured to transmit forces between pulleys of a transmission, or between other elements of a transmission or other device. FIG. 5A provides a cross-sectional view and FIGS. 5B and 5C provide perspective views. The belt 500 includes a plurality of plates or other segments (including example segment 501c) that form individual links in the chain of the belt. These segments are connected to each other by pins or other rotatable couplings (e.g., by example pin 531c). Each segment includes inward-facing contact surfaces (e.g., 510c), outward-facing contact surfaces (e.g., 520c), or other features (e.g., teeth) for contacting pulleys (e.g., split pulleys) or other elements of a transmission or other mechanism. As shown in FIG. 5C, these contact surfaces can span a range of radii, relative to the direction of flexion of the belt, that overlaps with the radius of a pin (e.g., 531c) or other features related to the pitch line of the belt.

In some examples, a belt as described herein may be configured to contact, and to transmit forces into/out of, pulleys, sprockets, or other elements that substantially do not change with respect to the diameter at which they contact the belt. In such examples (e.g., the example transmission 900 shown in FIGS. 9A-C), the belt could include teeth configured to engage with corresponding teeth on the pulley, sprocket, or other element. Such teeth could be formed into a surface of a flexible portion of the belt (e.g., into a portion of the belt formed as a timing belt) or a single tooth could be formed into each segment of a belt, e.g., into each segment of a multi-segment chain-type belt. By engaging with such an element via teeth, instead of, e.g., a flat, friction-based bearing surface, a variety of benefits may be realized. For example, the efficiency and service lifetime of a mechanism containing such a belt could be increased by reducing the amount of slip and wear experienced by a tooth-based contact rather than a friction-based bearing surface.

Figure 6A:
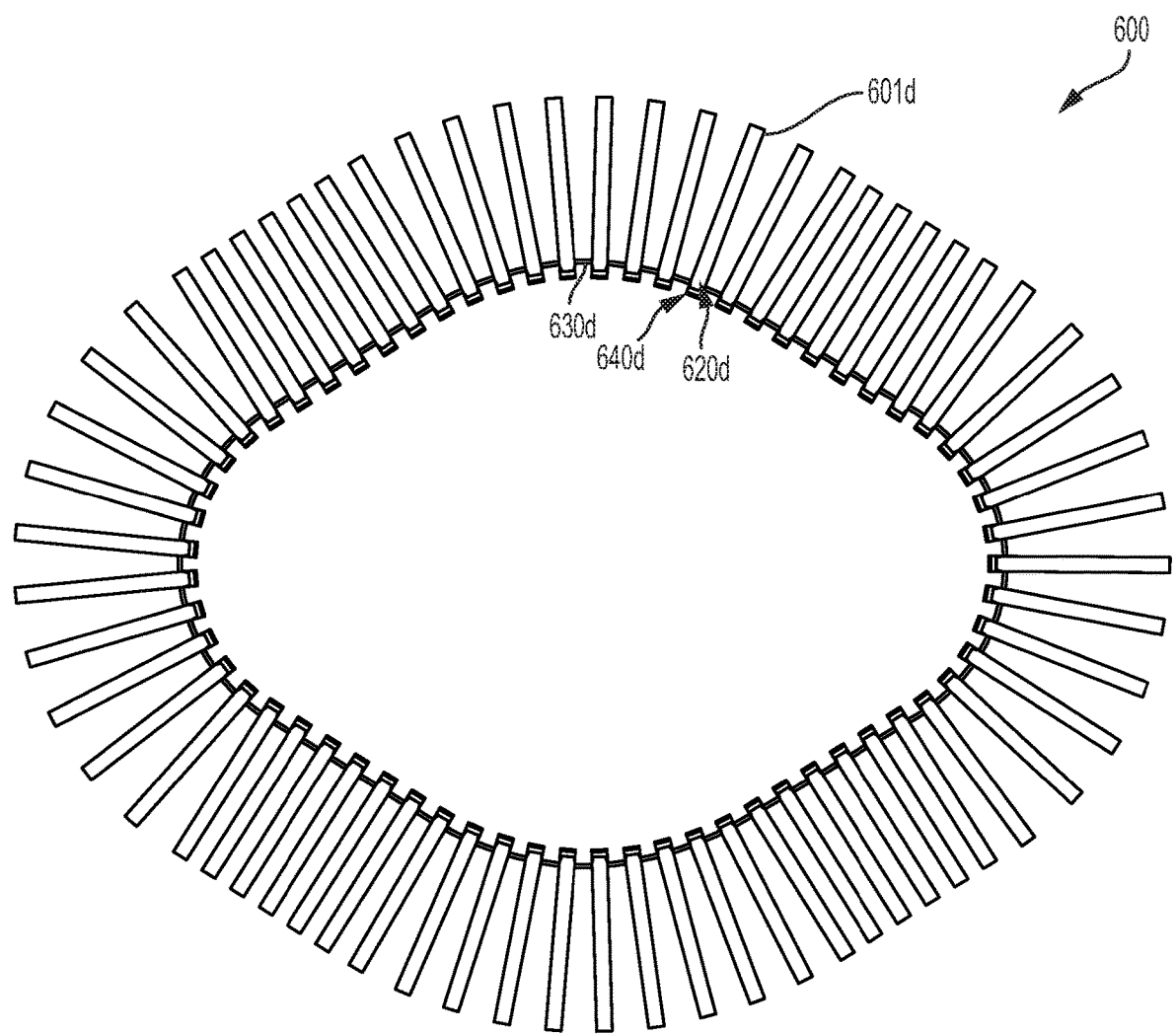
FIG. 6A is a cross-sectional view of elements of a belt.
Figure 6B:
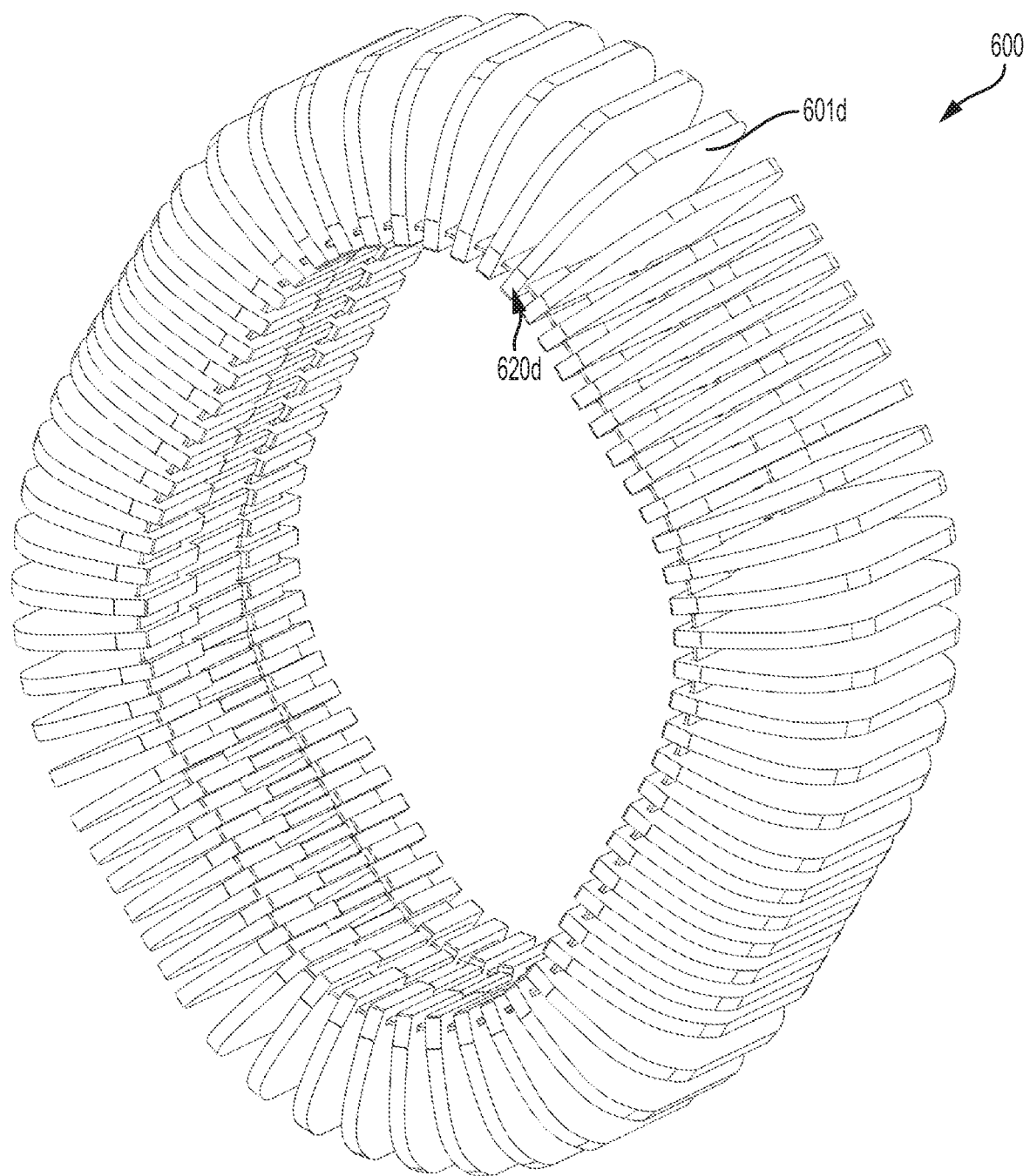
FIG. 6B is a perspective view of elements of the belt shown in FIG. 6A.

FIGS. 6A and 6B illustrate, in cross-section and perspective view, respectively, elements of such a belt 600 that is configured to transmit forces between pulleys of a transmission, or between other elements of a transmission or other device, using teeth. The belt 600 includes a plurality of plates or other segments (including example segment 601d) that are connected to each other by a band 630d (e.g., one or more steel bands) that can also provide tension along the length of the band 630d. Each segment includes a tooth (e.g., 640d), outward-facing contact surfaces (e.g., 620d), and/or other features (e.g., inward-facing contact surfaces) for contacting sprockets or other elements of a transmission or other mechanism. As shown in FIG. 6A, these contact surfaces can span a range of radii, relative to the direction of flexion of the belt, that overlaps with the pitch line of the belt 640d.

Segments of a multi-segment belt may include features to strengthen the segment and/or to prevent buckling of the segment when sustaining tension and/or compression loads between contact surfaces of the segment. For example, each segment could include bars, ridges, fins, or other features configured to stiffen the segment in order to prevent buckling of the segment. For example, FIG. 5A shows, in cross-section, such anti-buckling features (e.g., 550c) provided to increase the resistance of the segments to buckling. Such features may be continuous with the material of the segments (e.g., the segments may be formed, with the anti-buckling features, via casting, machining, or other processes). Alternatively, such features may be added to the material of the rest of the segment (e.g., via welding, soldering, bolting or the use of some other fastener(s), or by some other joining process).

Segments of a multi-segment belt may include additional or alternative features to provide some other benefit(s). For example, the segments may include damping elements (e.g., layers of viscoelastic material disposed in the spaces between the segments, springs or other elastic elements) in order to dampen vibration, reduce noise, and/or increase the efficiency of operation of a device (e.g., a transmission) that includes such a belt.

II. EXAMPLE VARIABLE TRANSMISSIONS

A mechanical transmission provides a coupling between an input and an output that is characterized by a transmission ratio. The transmission ratio characterizes the relationship between the rotational speed and torque at an input of the transmission to the rotational speed and torque at the output of the transmission. A transmission may thus be provided to modify the speed/torque of a rotation provided by a motor (or other torque-generating device), to control an overall impedance of an actuator or robot element, to increase the efficiency of an apparatus by permitting a motor to operate at a more efficient speed/torque, or to provide some other benefit. For example, a transmission is provided in an automobile to convert the high-speed, relatively low-torque output of an internal combustion engine to a lower-speed, higher-torque output to drive the wheels of the automobile. In another application, a transmission having a high transmission ratio may be provided in a robot arm to permit a very high speed, low-torque motor to provide a very high torque at a joint of the robot. Such a high speed, low-torque motor, combined with the transmission, may provide benefits including higher efficiency, lower overall mass, lower cost, or other benefits relative to the use of a high-torque motor without a transmission.

It can be desirable in a variety of applications to adjust the transmission ratio of a transmission during operation. For example, the transmission ratio could be controlled to adapt to changes in the torque and/or rotation speed to be provided at the output of the transmission (e.g., as the speed of an automobile increases), to maintain a driving motor within an efficient operational regime (e.g., high speed, low torque for an electrical motor), to adapt the effective impedance of the motor/transmission combination (e.g., to provide additional safety when a human interacts with a robot), or to provide some other benefit. In order for the transmission ratio of the transmission to be controllable, the transmission could include clutches, linear actuators, multiple different gear trains/planetary gear sets, or other elements that can be actively or passively operated electrically, mechanically, and/or hydraulically to effect changes in the transmission ratio. Such changes in transmission ratio could be between a number of different discrete transmission ratios. Alternatively, the transmission could be a continuously variable transmission configured to permit adjustment of the transmission ratio across a continuous range of transmission ratio values.

A continuously variable transmission can provide a number of benefits. For example, the transmission ratio may be controlled to an arbitrary value within a possible range of transmission ratios, rather than to a nearest value of a discrete set of transmission ratios provided by a non-continuously variable transmission. Accordingly, a continuously variable transmission permits the transmission ratio to be controlled to an optimal ratio such that a driving motor may be operated according to a high-efficiency speed/torque across a wide range of output speeds/torques. A continuously variable transmission may provide other benefits.

A transmission may be configured in a variety of ways to enable continuous control of transmission ratio across a range of transmission ratio values. In some embodiments, this may be achieved by controlling the effective diameter of one or more pulleys within the transmission. By controlling the effective diameter of a pulley, the ratio of rotation of that pulley relative to other elements (e.g., other pulleys) within the transmission, and thus the transmission ratio of the transmission, may be controlled.

In some examples, the pulley can be a split pulley having two half-pulleys. The half-pulleys have a common axis of rotation and each has an opposite conical (or otherwise-shaped) bearing surface that is in contact with a belt. The belt (e.g., a belt having a w-shaped cross-section) can thus drive, or be driven by, the split pulley. The effective diameter of the split pulley is related to the radius at which the belt contacts the half-pulleys. Thus, the effective diameter of the split pulley may be adjusted by changing the axial distance between the half-pulleys. By increasing the axial distance, the belt will contact the bearing surfaces of the half-pulleys closer to the axis of the split pulley, resulting in a reduced effective diameter. Conversely, the axial distance could be decreased such that the belt will contact the bearing surfaces of the half-pulleys farther from the axis of the split pulley, resulting in an increased effective diameter. The belt can be in contact with another pulley (e.g., another split pulley) to facilitate the realization of torque/rotation at an output (e.g., coupled to the additional pulley) in response to torque/rotation applied at an input (e.g., coupled to the first split pulley). The transmission ratio of such a transmission can be related to the ratio between the effective diameters of the pulleys with respect to their interaction with the belt. Tension in the belt may be maintained by adjusting the effective diameter of both pulleys, by having a tensioner pulley, or by other methodologies.

Relevant aspects of split pulleys are illustrated by way of example in FIGS. 7A-D. FIG. 7A shows a side view of a variable transmission 700 during a first period of time; FIG. 7B shows a top view of the transmission during the first period of time. The transmission 700 includes a first split pulley 710a having two half-pulleys, a second split pulley 710b having two half-pulleys, and a w-shaped belt 720 in contact with both split pulleys 710a, 710b. As shown in FIG. 7B, the axial distance between the two half-pulleys of the first split pulley 710a is $d_1$ and the axial distance between the two half-pulleys of the second split pulley 710b is $d_2$. A motor 740 is coupled to the first split pulley 710a to drive the transmission 700. As shown in FIG. 7A, the first 710a and second 710b split pulleys may have the same effective diameter, and thus the transmission ratio of the transmission 710 during the first period of time is 1:1.

In this example, the effective diameter of the first split pulley 710a can be controlled by controlling an axial distance between the half-pulleys of the first split pulley 710a, and the effective diameter of the second split pulley 710b can be controlled by controlling an axial distance between the half-pulleys of the second split pulley 710b. The result of changing these effective diameters (relative to FIGS. 7A and 7B) is shown in FIG. 7C, which shows a side view of the variable transmission 700 during a second period of time, and FIG. 7D, which shows a top view of the variable transmission 700 during the second period of time. As shown in FIG. 7D, the axial distance between the half-pulleys of the first split pulley 710a has decreased from $d_1$ to $d_3$, resulting in an increase in the effective diameter of the first split pulley 710a, and the axial distance between the half-pulleys of the second split pulley 710b has increased from $d_2$ to $d_4$, resulting in a decrease in the effective diameter of the second split pulley 710b. These changes in the effective diameters of the split pulleys 710a and 710b increase the transmission ratio of the transmission 700 (e.g., from a 1:1 transmission ratio in FIGS. 7A and 7B to a 3:1 transmission ratio in FIGS. 7C and 7D). Control of the axial distance between the half-pulleys of a split pulley (e.g., 710a) may be effected in a variety of ways by a variety of mechanisms, examples of which are described below. Accordingly, the effective diameter of the first split pulley 710a and/or the effective diameter of the second split pulley 710b may be controlled, thus controlling the transmission ratio of the transmission 700. As the effective diameter of the first split pulley 710a is changed, tension in the belt 720 may be maintained using an idler pulley, by changing the effective diameter of the second split pulley 710b, and/or by varying the axle-to-axle distance between split pulleys 710a and 710b. This may be effected in a variety of ways (e.g., by employing an actuator to independently control the axial distance between the half-pulleys of the second split pulley 710b, by using a mechanism to couple the axial distances of the two split pulleys 710a, 710b together such that controlling one axial distance effects control of the other, by using a passive mechanism including springs or other elastic elements). As shown in FIG. 7B, half-pulleys of the second split pulley 110b are coupled together via an elastic element 730 (e.g., a spring, coupled between a thrust bearing on the half-pulley and a mechanical ground of the transmission 700) such that an axial force is exerted between the half-pulleys of the second split pulley 710b. As the effective diameter of the first split pulley 710a changes, resulting changes in the tension in the belt 720 may interact with the axial force exerted by the elastic element 730 to effect a corresponding but opposite change in the effective diameter of the second split pulley 710b.

The arrangement of split pulleys, shown in FIGS. 7A-D, to form a variable transmission is intended as a non-limiting example embodiment. Such a transmission may be improved by configuring the split pulleys, belts, motors, shifting mechanisms, or other elements of such a transmission and/or of elements coupled thereto in alternative ways. For example, an improved variable transmission can be provided by nesting one of the split pulleys within the other. That is, some overlap occurs between outer circumferences of the pulleys. Such nesting can include the axis of rotation of one of the pulleys (the 'inner' pulley) being located within the outer circumference of the other pulley (the 'outer' pulley), or the entirety of one of the pulleys being located within the outer circumference of the other pulley (a 'fully nested' arrangement). In such examples, depending on the size of the 'inner' and 'outer' pulleys in such a configuration, the 'inner' pulley may partially extend beyond the outer circumference of the 'outer' pulley. Such a configuration could provide a variety of benefits. For example, by nesting one split pulley (the 'inner' split pulley) within the other (the 'outer' split pulley), the overall size of the transmission could be reduced. This can be of benefit in automotive and robotic applications, where the volume and weight of the transmission may be reduced compared to the non-nested split pulley designs employed in automotive applications or the fixed-ratio planetary, harmonic, or otherwise-configured transmission designs employed in robotic applications. Additionally, such a nested design can allow the transmission to have a controllable range of transmission ratios that includes forward and reverse ratios as well as a neutral (or 'non-driven output') configuration.

In such a nested arrangement, the outer pulley could be rotationally grounded (i.e., the half-pulleys of the outer pulley could be prevented from rotating) and the inner pulley could be driven, by one or more inputs, via a cam such that rotation of the input(s) caused the inner split pulley to orbit about a rotational axis of the input(s) (e.g., to engage in trochoidal motion and rotation). An output member could then be coupled to the inner split pulley (e.g., to one or both half-pulleys of the inner split pulley via a cage gear, a sun and/or ring gear, a planet carrier, an additional belt, or other methodologies) to permit realization of rotation and/or torque at the output member in response to the application of torque/rotation at the input member. Such a transmission could provide a variety of benefits, including reduced size, high transmission ratios, reversible transmission ratios, a neutral transmission ratio that decouples the input from the output, or other benefits.

Such a transmission may also allow for smaller changes in the axial separation of the split pulley halves to effect greater changes in the transmission ratio of the transmission, relative to a non-nested split pulley CVT configuration. Accordingly, the nested-pulley configuration may allow for increased speed in shifting the transmission ratio. Such increased shifting speed may provide a number of benefits, including increasing the safety of a robot by allowing the impedance of the robot's joints (and thus the effective impedance of the robot's limbs) to be continuously adjusted to increase the safety of the robot to any nearby humans (e.g., by reducing the impedance of the robot limb when in contact with a human).

In some examples, such a transmission could be configured such that it is controllable to have a transmission ratio of neutral or zero (i.e., that rotation of the input results in no rotation of the output) and/or to have negative transmission ratios (i.e., the transmission ratio of the transmission is controllable such that the direction of rotation of the output, relative to the input, is invertible). Such a transmission, having a transmission ratio that is controllable across a range of transmission ratio values that includes zero, may be referred to as an "infinitely variable transmission." Such a transmission may allow for braking or reversal of the direction of the transmission output without clutches, reducing the size and cost of the transmission relative to designs used, e.g., in automotive and robotics applications to provide reverse gearing, where multiple transmissions/gears and attendant clutches may be provided to allow for high torque and low speed operation in both directions.

Figure 8:
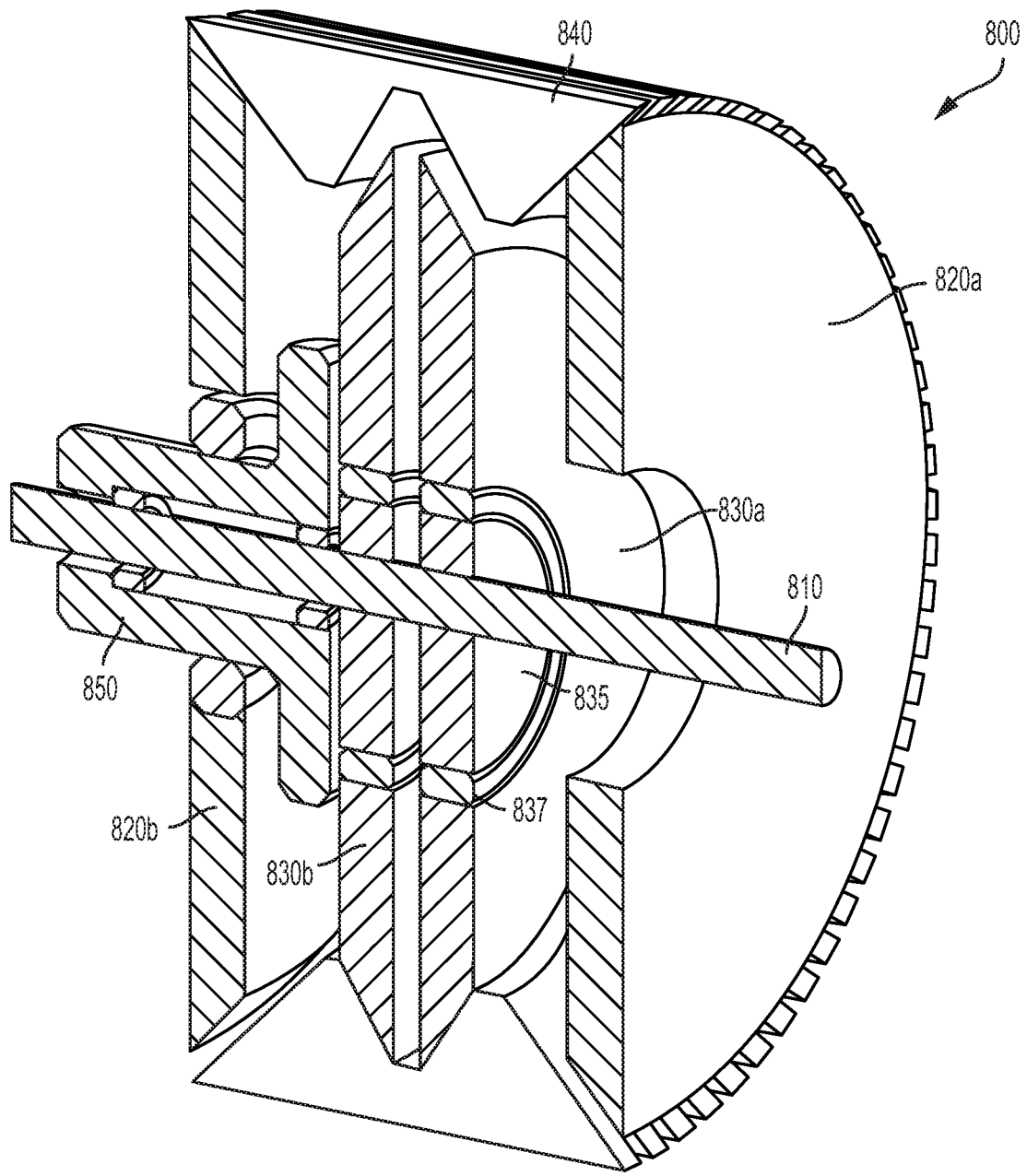
FIG. 8 is a perspective cross-sectional view of an example variable transmission.

An example of such a transmission is illustrated in FIG. 8. A variable transmission 800 includes a first split pulley having first 830a and second 830b half-pulleys. The transmission 800 additionally includes a second split pulley having third 820a and fourth 820b half-pulleys. The first and second split pulleys are coupled via a belt 840. The first split pulley is nested within the outer split pulley. This includes an axis of rotation of the first split pulley being located within an outer perimeter of the second split pulley. An input member 810 is coupled to the first split pulley via a cam 835 and a cam bearing 837. The input 810 and the first split pulley have respective different, offset axes of rotation. Rotation of the input 810 results in translation of the axis of rotation of the first split pulley about the axis of rotation of the input 810, rotation of the half-pulleys 830a, 830b, and a transmission of torque from the first split pulley to the second split pulley via the belt 840. Thus, rotation of the input 810 may result in cycloidal or some other variety of trochoidal motion of a particular portion of the first split pulley (e.g., of a particular point on the first half-pulley 830a).

The transmission 800 additionally includes an output member 850. The transmission 800 may be configured to generate a rotation and/or torque at the output member 850 in response to an applied rotation and/or torque at the input member 810 according to a controllable transmission ratio by mechanically grounding the half-pulleys of the second split pulley 820a, 820b to prevent them from rotating and by coupling the output member 850 to at least one of the half-pulleys of the first split pulley 830a, 830b such that rotation of the first split pulley results in rotation of the output member 850. This could include configuring the output member 850 as a cage gear configured to couple with corresponding elements (e.g., a plurality of formed holes) of a half-pulley 820a, 820b of the first split pulley.

Other properties of pulleys (e.g., nested pulleys), sprockets, or other elements of a transmission could be adjustable in order to control the transmission ratio of the transmission. For example, a degree of eccentricity of a pulley (e.g., an inner nested pulley), sprocket, or other adjustable-eccentricity rotating element could be adjusted in order to control the transmission ratio of a transmission that includes the adjustable-eccentricity rotating element. Such a transmission could also include a split pulley or otherwise configured pulley having an adjustable effective diameter such that, when the eccentricity of the adjustable-eccentricity rotating element is adjusted, the effective diameter of the pulley can also be changed, thereby controlling the transmission ratio of the transmission. Such a change in the effective diameter could be actively adjusted (e.g., by operating an actuator to effect the change) and/or a spring or other passive element(s) could act to adjust the effective diameter in response to the change in eccentricity. Alternatively, the effective diameter of the outer split pulley could be actively adjusted (e.g., by operation of one or more lead screws coupled to one or both of the half-pulleys of the outer split pulley) in order to control the transmission ratio of the transmission. Such an embodiment could also include actively adjusting the eccentricity of the inner pulley, or using passive elements (e.g., springs) to adjust the eccentricity of the inner pulley as a result of adjustment of the effective diameter of the outer split pulley (e.g., to maintain a specified tension in the belt).

Since adjusting the eccentricity of the adjustable-eccentricity rotating element and/or adjusting the effective diameter of the outer split pulley facilitates the control of the transmission ratio, the diameter of the adjustable-eccentricity rotating element may be static. Accordingly, a belt of the transmission can interact with the adjustable-eccentricity rotating element using teeth or other elements to reduce slippage, reduce wear, increase efficient, increase lifetime, or otherwise improve the performance of the transmission. For example, the belt of such a transmission could include teeth for interfacing with the adjustable-eccentricity rotating element and contact surfaces (e.g., outward-facing contact surfaces) for contacting a conical split pulley whose effective diameter is adjustable by controlling an axial separation between the halves of the conical split pulley.

Figure 9A:
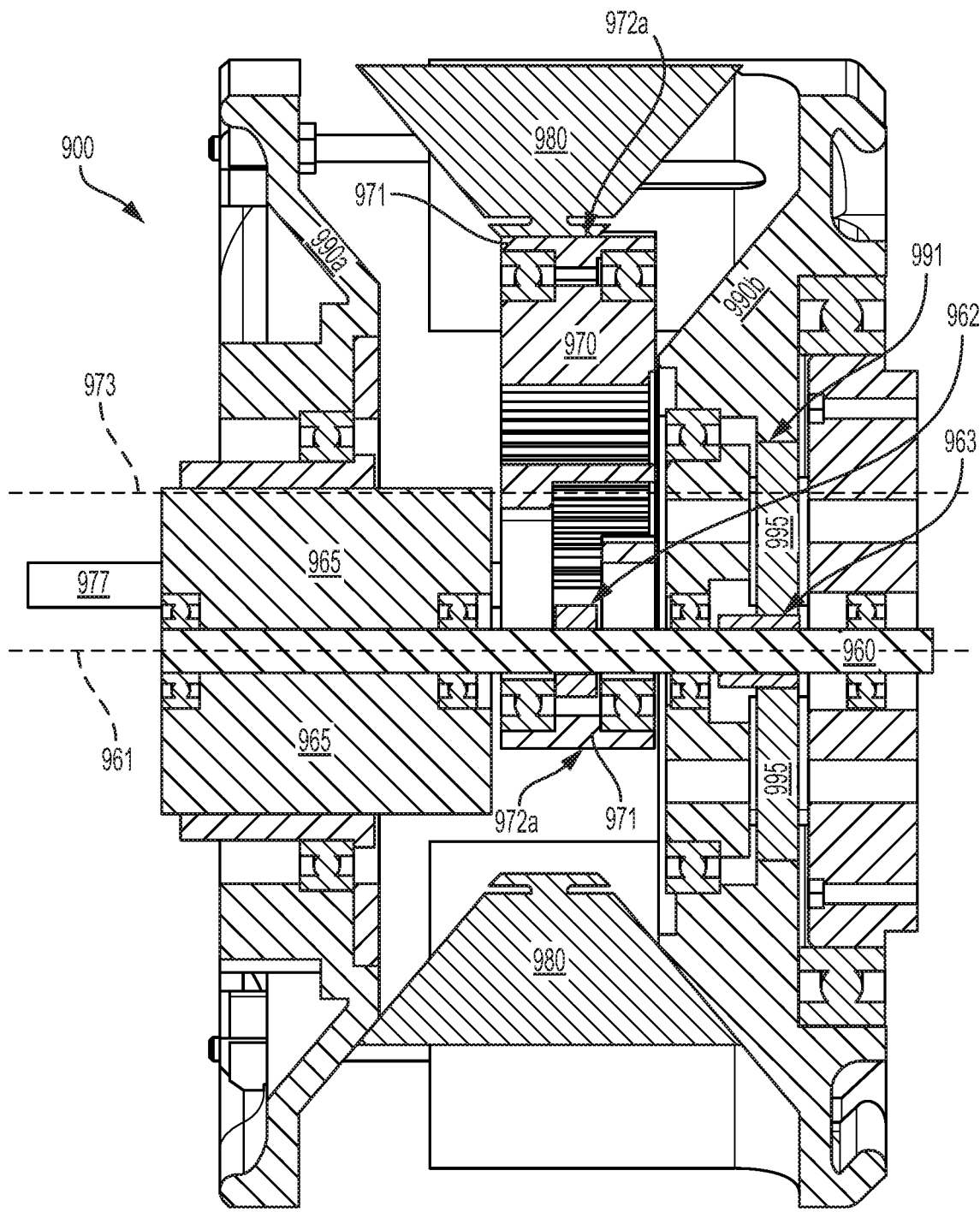
FIG. 9A is a cross-sectional view of an example variable transmission.
Figure 9C:
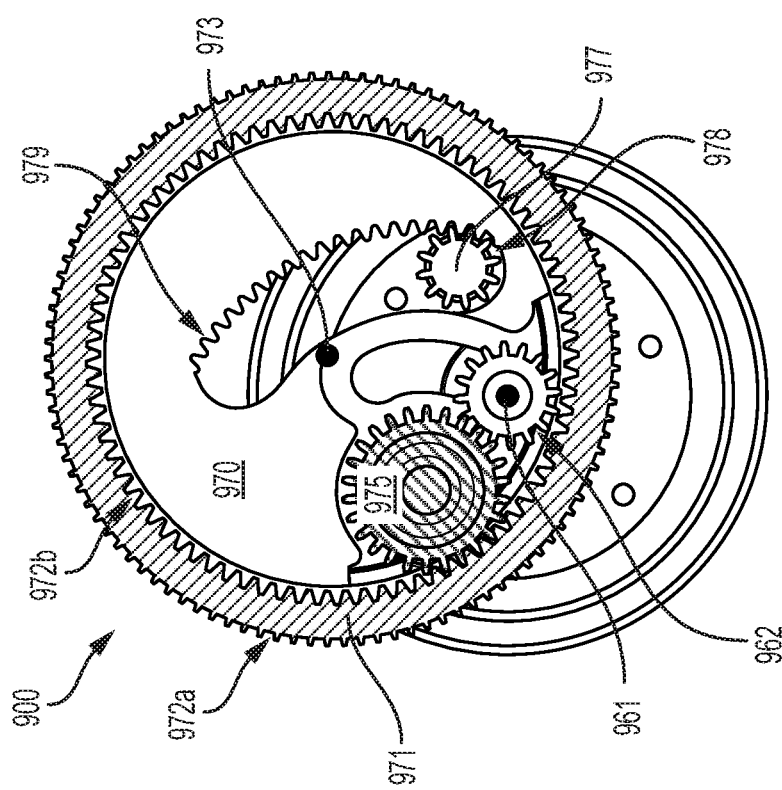
FIG. 9C is a cross-sectional view of the example variable transmission shown in FIG. 9A, adjusted to a second transmission ratio.
Figure 9B:
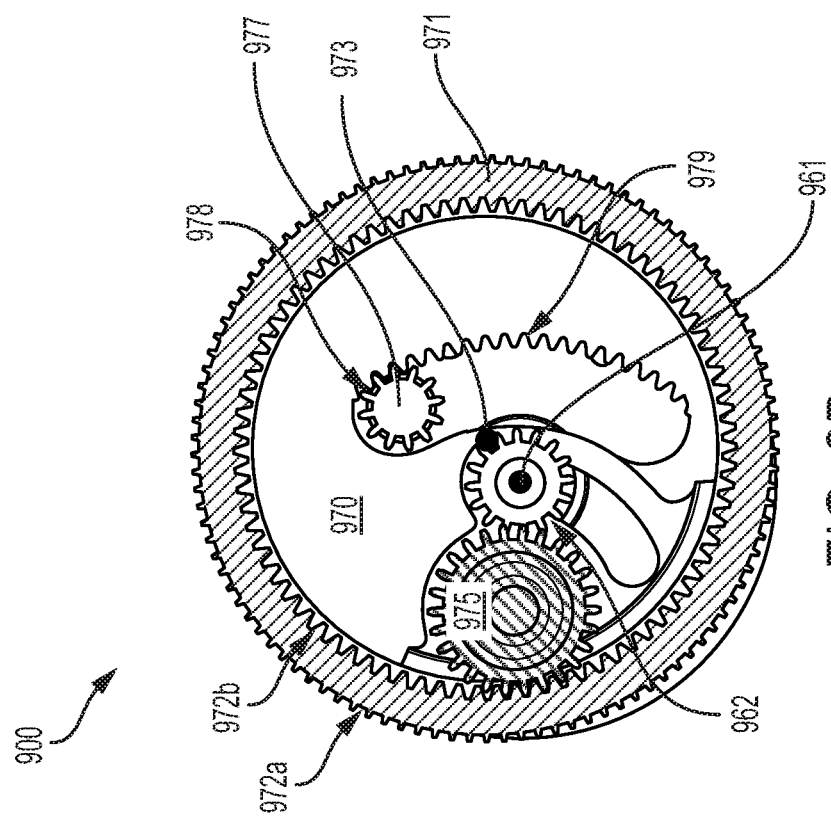
FIG. 9B is a cross-sectional view of the example variable transmission shown in FIG. 9A, adjusted to a first transmission ratio.

FIGS. 9A, 9B, and 9C illustrate an example of such a transmission. Example transmission 900 is shown in cross-section through a central axis 961 of the transmission 900. FIGS. 9B and 9C show the transmission 900 in a cross-section perpendicular to the central axis 961 when the transmission 900 is adjusted to respective first and second different transmission ratios. An input member 960 and an output member 965 are capable of rotation about the central axis 961. An inner pulley 971 is configured to rotate about a controllable-eccentricity cam 970. A gear 978 fused to the control member 977 is in contact with a rack 979 of the controllable-eccentricity cam 970 such that rotation of the control member 977 results in adjustment of a distance between the axis of rotation 973 of the inner pulley 971 and the central axis 961 and thus adjustment of the eccentricity of the cam 970 and of the inner pulley 971 relative to the central axis 961. This is shown by way of example in the differences between the configuration of the transmission 900 as shown in FIG. 9B and the configuration of the transmission 900 as shown in FIG. 9C. The controllable-eccentricity cam 970 is coupled to the output member 965 such the controllable-eccentricity cam 970 and the output member 965 rotate together about the central axis 961 (e.g., such that precession of the inner pulley 971 around the central axis 961 results in rotation of the output member 965 about the central axis 961).

The inner pulley 971 includes an inner ring gear 972b that is in contact with an idler gear 975 that is, in turn, in contact with a first sun gear 962 that is fused to the input member 960. Rotation of the control member 977 can result in rotation of the controllable-eccentricity cam 970 about an axis of rotation of the idler gear 975 such that the idler gear remains in contact with both the inner ring gear 972b and the first sun gear 962. The inner pulley 971 includes a sprocket 972a that is in toothed contact with a belt 980. The belt is also in contact with conical bearing surfaces of an outer conical split pulley that is made up of first 990a and second 990b half-pulleys. The second half-pulley 990b of the outer conical split pulley includes an inner ring gear 991 that is in contact with a number of planet gears 995 that are, in turn, in contact with a second sun gear 963 that is fused to the input member 960.

Accordingly, rotation of the input member 960 results in rotation of the inner pulley 971 about its axis of rotation 973 and rotation of the first 990a and second 990b half-pulleys of the outer conical split pulley about the central axis 961. These rotations in turn result, by the transmission of forces through the belt 980, in rotation of the cam 970 and output member 965 about the central axis. The ratio between a rotation/torque at the input member 960 and a rotation/torque at the output member 965 resulting therefrom (or vice versa), i.e., the transmission ratio of the transmission 900, can be controlled by rotating the control member 977 so as to adjust the eccentricity of rotation of the controllable-eccentricity cam 970 relative to the central axis 961.

Note that the transmission 900 shown in FIGS. 9A-C is only one example of a transmission wherein adjustment of the eccentricity of a pulley or other controllable-eccentricity element (e.g., a sprocket, a grooved pulley) results in the control of the transmission ratio of the transmission. For example, such a transmission could be similar the transmission 900 except that the halves of the outer split pulley 990a, 990b are prevented from rotating (i.e., are rotationally grounded) instead of being driven by the input member 960 (e.g., directly, via the planetary gears 995, or by some other means).

A nested pulley transmission as described above, having a single inner split pulley, can provide a variety of benefits. However, the use of a single inner split pulley can lead to unwanted effects. For example, the off-center mass of the inner split pulley can result in vibration, especially at high speeds, and the resultant time-varying forces and torques can have unwanted effects on the transmission and on elements coupled to the transmission. This can result in increased wear, reduced lifetime, increased component cost, increased noise, reduced efficiency, or other unwanted effects. This effect can, in some embodiments, be wholly or partially alleviated by the addition of a counterweight to balance the off-axis mass of the inner split pulley, Additionally, unbalanced forces and/or torques applied to the off-center inner split pulley can result in significant loads being transmitted through bearings, including bearings that may be required to operate at high speed.

To address these issues, a nested split pulley transmission as described herein could include multiple inner split pulleys arranged in a balanced configuration. For example, such a transmission could include two inner split pulleys arranged opposite each other within the transmission such that the masses of the inner split pulleys are balanced when the transmission is operated. Accordingly, this transmission configuration could reduce vibration. Correspondingly, such a transmission could be operated at higher speeds, at greater efficiency, could include fewer and/or less expensive bearings, or offer improved characteristics in some other way.

Such a balanced split pulley transmission could also exhibit reduced load forces transmitted through bearings of the transmission. This is because forces exerted onto the inner split pulleys (e.g., from the outer split pulley, transmitted via the belt) could fully or partially balance. Accordingly, such forces (e.g., between one of the inner split pulleys and the outer split pulley) would not need to be balanced via forces exerted through bearings of the transmission. As a result, the size, weight, number, and/or cost of such bearings could be reduced and/or the transmission could be operated at higher speeds and/or torques. Additionally, the strength, size, mass, and/or cost of elements of the housing of the transmission used to couple such balancing forces could be reduced.

Figure 10A:
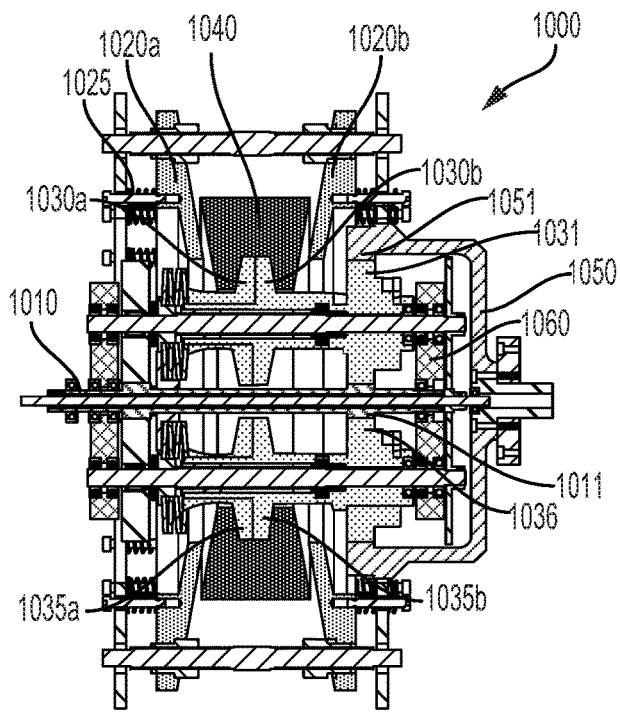
FIG. 10A is a cross-sectional view of an example variable transmission.
Figure 10B:
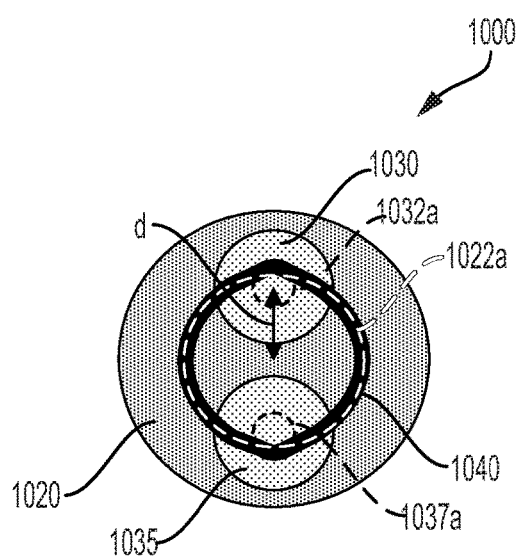
FIG. 10B is another cross-sectional view of the variable transmission depicted in FIG. 10A.
Figure 10C:
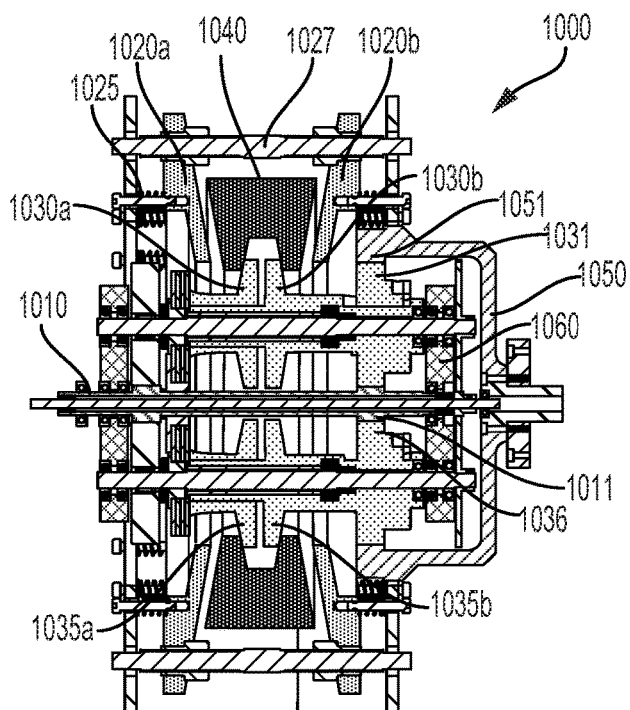
FIG. 10C is a cross-sectional view of the variable transmission depicted in FIG. 10A following a change in the transmission ratio of the transmission.
Figure 10D:
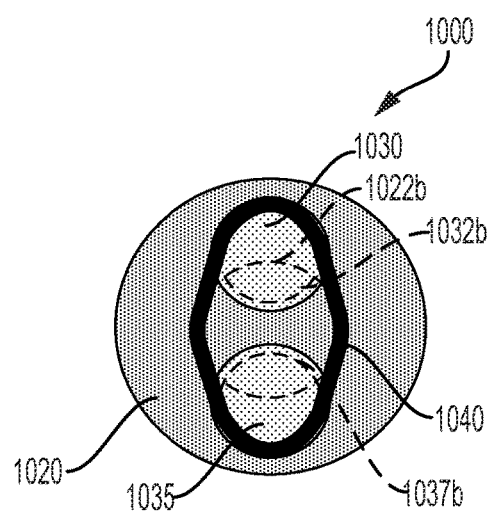
FIG. 10D is another cross-sectional view of the variable transmission depicted in FIG. 10C.

FIGS. 10A-D show an example balanced nested split pulley transmission 1000 having two inner split pulleys 1030, 1035 and an outer split pulley 1020. FIGS. 10A and 10C show the transmission 1000 according to a first cross-sectional view, while FIGS. 10B and 10D show a simplified schematic of the transmission 1000 according to a cross-sectional view that is perpendicular to the cross-sectional view of FIGS. 3A and 3C. FIGS. 10A and 10B illustrate the transmission 1000 when the transmission 1000 is in a first configuration, thereby exhibiting a first transmission ratio (e.g., a reverse transmission ratio). FIGS. 10C and 10D illustrate the transmission 1000 when the transmission 1000 is in a second configuration, thereby exhibiting a second transmission ratio (e.g., a forward transmission ratio) that differs from the first transmission ratio.

The outer split pulley 1020 includes first 1020a and second 1020b half-pulleys that are in contact with a belt 1040. The first inner split pulley 1030 includes first 1030a and second 1030b half-pulleys that are in contact with the belt 1040 and the second inner split pulley 1035 includes first 1035a and second 1035b half-pulleys that are also in contact with the belt 1040. An input member 1010 can drive an output member 1050 by the transmission of torques through the transmission 1000 via the inner split pulleys 1030, 1035 and other elements of the transmission 1000. The input member 1010 is coupled (e.g., fused) to a sun gear 1011 that is in geared contact with first 1031 and second 1036 planet gears that are coupled to the first 1030 and second 1035 inner split pulleys, respectively. The first 1031 and second 1036 gears are also in geared contact with a ring gear 1051 that is coupled to the output member 1050. The relative locations of the inner split pulleys 1030, 1035 are maintained in part by a planet carrier 1060.

As shown, the transmission 1000 is configured to realize a torque/rotation at the output member 1050 in response to an applied torque/rotation at the input member 1010 by transmitting torques between the sun gear 1011 and the planet gears 1030, 1035 and between the planet gears 1030, 1035 and the ring gear 1051. This realization of torque at the output is caused by torques transmitted between the mechanically grounded outer split pulley 1020 and the inner split pulleys 1030, 1035 via the belt. The transmission 1000 may be configured to be backdrivable, such that torques/rotations may be realized at the input member 1010 in response to torques/rotation applied at the output member 1050.

Note that the configuration of a nested, balanced split pulley transmission shown in FIGS. 10A-10D is intended as a non-limiting example of a nested, balanced split pulley transmission. Input and output members may be coupled, alternatively, to sun gears, planet carriers, ring gears, output split pulleys, and/or other elements of the transmission 1000, with appropriate complementary elements rotationally grounded, according to an application. For example, the ring gear 1051 could be grounded and the outer split pulley 1020 could be allowed to rotate. In such an example, an output member could be coupled to the outer split pulley 1020 and rotations and/or torques could be realized at the outer split pulley 1020 due to rotations and/or torques applied at the input member 1010 due to the operation of the transmission 1000. Such alternatively configurations of a nested, balanced split pulley transmission may be selected in order to set the range of transmission ratios available to the transmission, to reduce parts counts or otherwise reduce cost of the transmission, to simplify assembly of the transmission, to match the volume or size of the transmission to an application, or to provide some other benefit.

An overall transmission ratio of the transmission 1000 between the input member 1010 and the output member 1050 is related to a variety of factors including the gear ratio between the sun gear 1011 and the planet gears 1031, 1036, the gear ratio between the planet gears 1031, 1036 and the ring gear 1051, and a ratio between the 'effective diameters' of the outer split pulley 1020 and the inner split pulleys 1030, 1035. The 'effective diameter' of one of the outer split pulley 1020 or inner split pulleys 1030, 1035 is the diameter of the pulley at which the belt 1040 (e.g., a center line, a pitch line, a line at which a central band of flexible and substantially non-extensible material runs through the belt, or some other line of flexion or curvature) contacts the half-pulleys of the split pulley.

When the belt 1040 is under tension, the effective diameter of a particular split pulley, with respect to its interaction with the belt 1040, will be related to the axial distance between the half-pulleys of the particular split-pulley. This is illustrated by FIGS. 10B and 10D, which show the first 1030 and second 1035 inner split pulleys and the outer split pulley 1020. FIG. 10B shows, during a first period of time when the transmission is exhibiting a first transmission ratio, the effective diameters of the inner split pulleys 1032a, 1037a and the effective diameter of the outer split pulley 1022a. The belt 1040, being under tension, conforms to the inner 1030, 1035 and outer 1020 split pulleys along their respective effective diameters to provide a first transmission ratio (e.g., a reverse transmission ratio) during the first period of time. FIG. 10D shows, during a second period of time when the transmission is exhibiting a second transmission ratio, the effective diameters of the inner split pulleys 1032b, 1037b and the effective diameter of the outer split pulley 1022b. The effective diameters of the inner split pulleys have increased relative to FIG. 10B, while the effective diameter of the outer split pulley has decreased. The belt 1040, being under tension, conforms to the inner 1030, 1035 and outer 1020 split pulleys along their respective effective diameters to provide a second transmission ratio (e.g., a forward transmission ratio) during the second period of time that differs from the transmission ratio during the first period of time.

The axial distances between the respective half-pulleys of the outer split pulley and the inner split pulleys can be adjusted to control the diameters at which the split pulleys 1020, 1030, 1035 contact the belt 1040. Accordingly, the overall transmission ratio of the transmission 1000 can be controlled across a range of transmission ratios. For example, the effective diameter of the outer split pulley is determined by a combination of the tension in the belt 1040, the strength of optional springs 1025 (or other elastic elements) that couple between the half-pulleys 1020a, 1020b of the outer split pulley, and the setting of differently pitched (e.g., threaded and reverse-threaded) lead screws (e.g., 1027) that engage with threads of the half-pulleys 1020a, 1020b of the outer split pulley. Accordingly, the effective diameter of the outer split pulley can be controlled by rotating the lead screws 1027 to adjust the axial distance between the half-pulleys 1020a, 1020b of the outer split pulley. Note that the axial distance between half-pulleys of a split pulley as described herein may be controlled only by active means (e.g., a lead screw 1027), only by passive means (e.g., a spring 1025), or by a combination of active and passive means. Such methods may additionally or alternatively be used to control the effective diameter of the inner split pulleys. Additionally or alternatively, other methods of providing a passive elastic force and/or an active positioning force between half-pulleys of a split pulley can be used.

The range of transmission ratios can include positive and negative (i.e., forward and backward) transmission ratios, and may include one or more 'neutral' transmission ratios at which torques/rotations are not realized at the output member 1050 in response to the application of torques/rotations at the input member 1010. The axial distances between the respective half-pulleys of the outer split pulley and/or between the respective half-pulleys of the inner split pulleys can be controlled using a variety of mechanisms.

During operation of the transmission 1000, the inner split pulleys 1030, 1035 rotate about respective axes of rotation. The inner split pulleys 1030, 1035 are disposed within the transmission 1000 (e.g., rotationally coupled to one or more planet carriers 1060) such that the axes of rotation of the inner split pulleys 1030, 1035 are disposed regularly (i.e., 180 degrees apart) around a central axis of rotation of the transmission 1000 and at a specified distance, d, from the central axis of rotation. The sun gear 1011 and ring gear 1051 also rotate about the central axis of rotation. The two inner split pulleys 1030, 1035 are disposed in this way, about the central axis of rotation, in order to substantially balance any reaction forces that may be exerted onto the inner split pulleys 1030, 1035 by the belt 1040 and to balance the masses of the inner split pulleys 1030, 1035 so as to reduce vibration that may occur when the transmission 1000 is operated.

Note that a balanced nested split pulley transmission as described herein can include more than two inner split pulleys. Such a transmission could include three, four, or more inner split pulleys according to an application. The inner split pulleys of such a transmission could be distributed regularly about a central axis of rotation.

The two, three, or more inner split pulleys of a balanced nested split pulley transmission as described herein can be arranged regularly about a central axis of rotation in order to reduce vibration, to balance forces exerted onto the inner split pulleys, or to provide some other benefit. For example, a two-inner-pulley transmission could have inner pulleys spaced 180 degrees apart, a three-inner-pulley transmission could have inner pulleys spaced 120 degrees apart, a four-inner-pulley transmission could have inner pulleys spaced 90 degrees apart, etc. The inner split pulleys being 'regularly' arranged about a central axis of rotation includes the axes of rotation of the inner split pulleys being disposed about the central axis of rotation at angles that are within ten degrees of mathematical regularity. For example, a transmission having two inner split pulleys could have the inner split pulleys disposed 170 degrees (or, equivalently, 190 degree) from each other about the central axis of rotation. In another example, a transmission having four inner split pulleys could have the inner split pulleys disposed at intervals of 80 degrees, 90 degrees, 100 degrees, and 90 degrees from each other about the central axis of rotation. Similarly, the distances been the axes of rotation of the inner split pulleys and the central axis of rotation may differ from uniformity by a specified amount, e.g., by less than 15% of the mean distance between the central axis of rotation and the axes of rotation of the inner split pulleys.

These slight deviations from perfect regularity and/or uniformity could be done to facilitate fabrication and/or assembly of the transmission, to account for tolerances in manufacturing, to allow for the placement of shifting mechanisms within the transmission, or to provide some other benefit. These benefit(s) may be valued more highly than the slight increase in vibration, unbalanced forces, or other unwanted effects that may accompany disposing the inner split pulleys slightly irregularly within the transmission. In some examples, transmissions exhibiting significant departures from regularity and/or uniformity may be provided in order to allow for the placement of additional mechanisms within the transmission or to provide some other benefit. This may be done in order to access the benefits of such irregular/non-uniform configurations where such benefits outweigh the corresponding reduced effectiveness of the configuration with respect to vibration reduction, balancing of forces exerted onto the inner split pulleys, or the other benefits provided by inner pulleys set in a fully regular and uniform arrangement. Such benefits may include providing a greater torque capacity with space for a mechanical pass-through or some other benefit over either a fully balanced pulley placement.

In transmissions having multiple inner split pulleys, there may be slight differences in the effective diameter of the various inner split pulleys. These differences may be due to manufacturing tolerances, uneven wear, differences in the property of springs or other components, time-varying loads transmitted through the transmission, or other factors. In some examples (e.g., wherein the inner pulleys are coupled to an input or output via a single, common ring gear or planet carrier), such differences in the effective diameters of the inner pulleys can result in reduced efficiency, reduced load capacity, reduced operational lifetime, increased and/or uneven wear of bearings, contact surfaces, or other components, increased slippage of the belt against one or more of the inner pulleys, or other unwanted effects. These effects may be caused by a ring gear, planet carrier, and/or other components of the transmission constraining the inner pulleys to rotate at the same speed and/or to the same degree.

In order to address this potential concern, the two or more inner pulleys could be coupled to an output (or an input) of the transmission via a differential. Such a differential could be configured to allow the inner pulleys to exhibit differential rotation about their respective axes of rotation (e.g., to rotate at slightly different speeds and/or through slightly different angles) while allowing a net torque and/or rotation of the inner pulleys (e.g., about their respective axes of rotation, about an axis of rotation of a planet carrier or some other axis of rotation that is common to the inner pulleys) to be transmitted out of the transmission (e.g., to drive a load coupled to the output of the transmission). Such a differential could be configured in a variety of different ways.

Figure 11A:
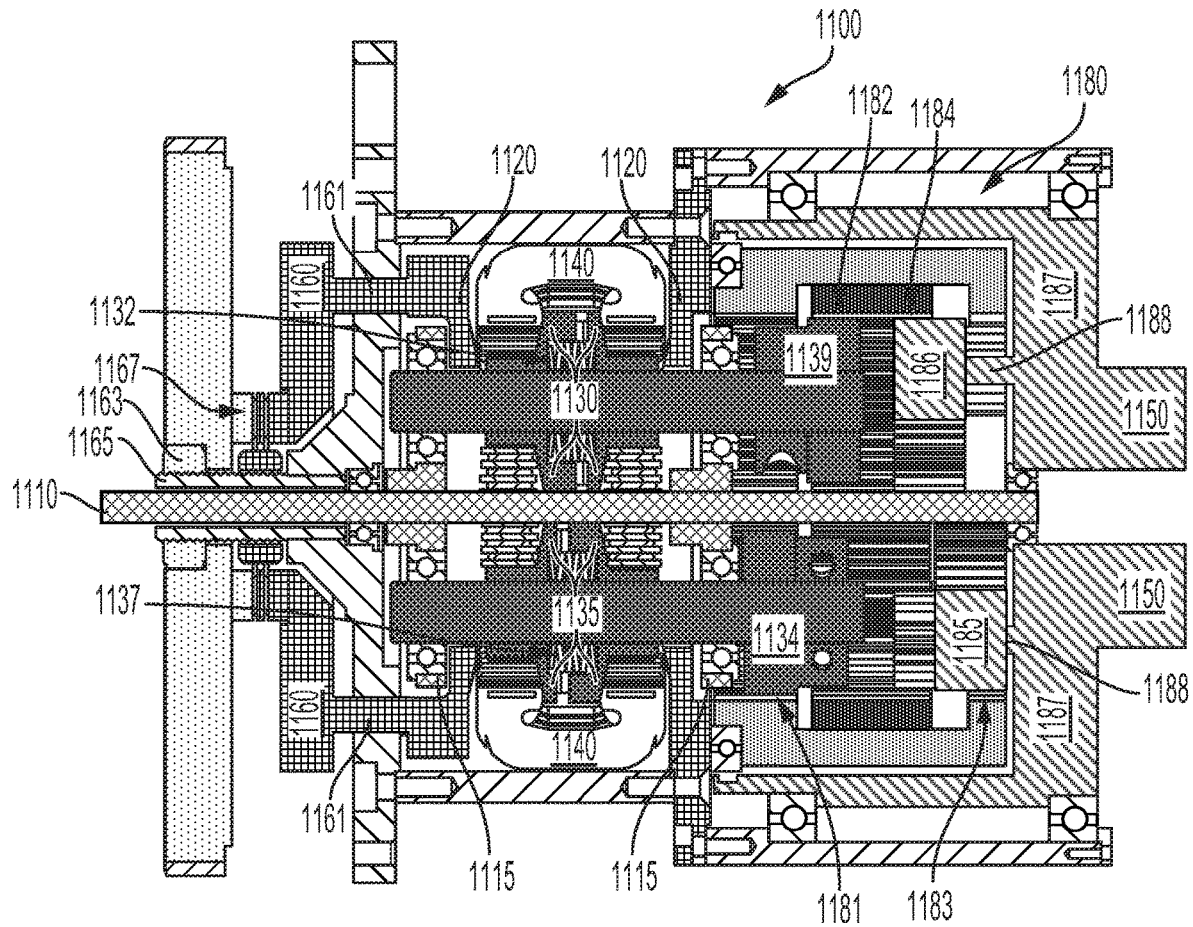
FIG. 11A is a cross-sectional view of an example variable transmission.
Figure 11B:
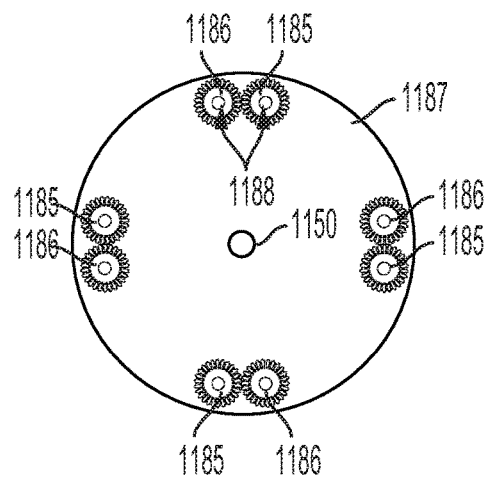
FIG. 11B is another cross-sectional view of the variable transmission depicted in FIG. 11A.

FIGS. 11A and 11B show elements of an example nested-pulley transmission 1100. FIG. 11A shows the transmission 1100 in a first cross-sectional view and FIG. 11B shows elements of a differential 1180 of the transmission 1100 in a different cross-sectional view. The transmission 1100 includes an input member 1110 coupled to a planet carrier 1115. First 1130 and second 1125 inner split pulleys are rotationally coupled to the planet carrier. The inner split pulleys 1130, 1135 are in contact with inward-faces contact surfaces of a belt 1140. Outward-facing contact surfaces of the belt 1140 are in contact with an outer split pulley 1120 that is rotationally grounded (the points of contact are not shown in FIG. 11A, as they are not visible in the particular cross-sectional plane depicted in FIG. 11A). Axial distances between half-pulleys of the inner split pulleys 1130, 1135 are controlled by tension in the belt 1140 and tension provided by springs 1132, 1137 disposed between opposite half-pulleys of respective split pulleys 1130, 1135.

A transmission ratio of the transmission 1100 can be controlled by adjusting the axial distance between the half-pulleys of the outer split pulley 1120. Such an adjustment can also result in a change in the axial distances between the half-pulleys of the inner split pulleys 1130, 1135 and thus to a change in the effective diameters of the inner 1130, 1135 and outer 1120 split pulleys as the contact surfaces of the belt 1140 move to contact the split pulleys at different locations. Such an adjustment may result in differences in the rotational speed and/or angle of the inner split pulleys 1130, 1135 relative to each other. In order to compensate for potential unwanted effects of such differential rotation, the inner split pulleys 1130, 1135 are coupled to an output member 1150 of the transmission via a differential 1180.

The axial distance between the half-pulleys of the outer split pulley 1120 can be adjusted in a variety of ways. For example, a number of lead screws could engage with one or both of the half-pulleys of the outer split pulley 1120 at respective different locations such that rotation, in concert, of such multiple lead screws results in adjustment of the axial distance. Alternatively, a single lead screw or other element could be coupled (e.g., rigidly coupled or fused) to multiple points on one of the half-pulleys in order to effect adjustment of the axial separation via actuation of a single element. Such a configuration has the benefit, relative to a multiple-lead screw arrangement or other multiple-actuator arrangement, of reducing difficulties in adjustment of the axial separation that may occur due to slight differences in the actuation provided by each of the multiple lead screws (e.g., differences with respect to stiction, differential rotation, local variations in screw pitch, differences in friction at the screw surface, or other factors that may result in binding, changes in the alignment of the half-pulley, or other undesired effects).

FIG. 11A illustrates such a single-actuator arrangement. The left half-pulley of the outer split pulley 1120 is coupled to a nut 1163 via a thrust bearing 1167, a plate 1160, and rods 1161. Rotation of the nut 1163 relative to a screw 1165 that is in threaded contact with the nut 1163 can thus result in adjustment of the axial separation between the half-pulleys of the outer split pulley 1120.

The differential 1180 depicted in FIGS. 11A and 11B is a spur gear differential, but alternative types of differential could be applied. The differential 1180 includes a first set of spur gears 1185 that are coupled to the first inner split pulley 1130 via a first ring gear 1183. The differential 1180 also includes a second set of spur gears 1186 that are coupled to the second inner split pulley 1135 via a second ring gear 1184. Each spur gear of the first set of spur gears 1185 engages with a respective spur gear of the second set of spur gears 1186. The sets of spur gears 1185, 1186 are mechanically coupled to the output member 1150 via a plate 1187 and a plurality of pins 1188. The first ring gear 1183 is coupled to the first inner split pulley 1130 via a third ring gear 1181 that is fused to the first ring gear 1183 and a first spur gear 1134 that is fused to the first inner split pulley 1130 such that the first spur gear 1134 rotates with the first inner split pulley 1130. The second ring gear 1184 is coupled to the second inner split pulley 1135 via a fourth ring gear 1182 that is fused to the second ring gear 1184 and a second spur gear 1139 that is fused to the second inner split pulley 1135 such that the second spur gear 1139 rotates with the second inner split pulley 1135.

Note that nested-pulley transmissions as described herein (e.g., 800, 900, 1000) may include non-split inner pulleys. Such transmission may have a fixed transmission ratio. Alternatively, the transmissions ratio of such transmissions may be adjustable, e.g., by adjusting the axial distance between the half-pulleys of the outer split pulley, by adjusting the distance between the axis/axes of rotation of the inner pulley(s) and the central axis of rotation of the transmission, by adjusting a tension in the belt, and/or by using some other means to control the transmission ratio of a transmission as described herein when the inner pulley(s) are not split pulleys.

Additionally, while the transmissions described herein are characterized as including inputs from which power is transmitted to outputs, these transmissions may additionally or alternatively be configured to be back-drivable or otherwise configured to permit bidirectional energy transmission and/or energy transmission from output(s) to input(s). For example, transmissions as described herein could be used to bidirectionally transfer energy between joints of a robot, e.g., to increase the overall efficiency of the robot by permitting energy to be harvested from one joint (e.g., a joint currently receiving energy from, e.g., contact with the ground) and applied to another joint (e.g., a joint currently being employed to exert force on a payload), or vice versa. Additionally, such a configuration could permit multiple degrees of freedom (e.g., of one or more joints of a robot) to be driven by a single motor (e.g., via respective nested-pulley infinitely variable transmissions).

III. EXAMPLE DIFFERENTIAL SHIFTING MECHANISMS

The transmission ratio of a split pulley variable transmission may be controlled by controlling the axial distance between the half-pulleys of the one or more split pulleys of the transmission. Accordingly, a belt of the transmission will contact bearing surfaces (e.g., conical bearing surfaces of the half-pulleys of a conical split pulley) at different locations, resulting in a change in the effective diameter of the split pulley and a change in the transmission ratio of the transmission. Such bearing surfaces may be configured to provide enhanced traction against the belt, e.g., by including surface textures or roughening, by being composed of a specified material to enhance traction and/or reduce slipping against the belt, or by being configured in some other manner to enhance traction with the belt. Where the variable transmission includes multiple inner split pulleys (e.g., in a balanced arrangement of two, three, or more inner split pulleys), a planetary gearset or some other mechanism may be employed to control, in common, the axial distance between the half pulleys of each of the inner split pulleys. Alternatively, the axial distance of only one of the inner split pulleys could be controlled, with the axial distances of the other split-pulleys being set by a spring or other passive element to follow the axial distance of the controlled split pulley.

A variety of mechanisms may be applied to effect such control of the axial distance between the half-pulleys. In some examples, the split pulley may be driven by two (or more) inputs and a differential may be provided to apportion torque from the two inputs between applying power to drive an output of the transmission and applying power to effect shifting of the transmission ratio of the transmission. For example, such a differential could be configured such that a torque difference between the two inputs causes axial force to be applied, via the differential, between first and second half-pulleys of a split pulley. Accordingly, the axial distance between the first and second half-pulleys could increase or decrease, enabling a change in an effective diameter of the split pulley. By facilitating the control of such changes in the axial distance, the differential permits control of the transmission ratio of the transmission that includes the split pulley. The differential could additionally apply a net torque from the inputs to the split pulley such that the net torque results in the realization of an output torque at an output of the transmission (e.g., due to transmission of torques via a belt, an additional split pulley, and/or other elements).

Such a differential mechanism may provide a variety of benefits. For example, it may permit two high-power drive motors to be applied to both driving the output of a transmission and to effecting changes in the transmission ratio of the transmission. Since the rate at which transmission ratio shifts may occur is related to the power applied to effect the shift, the use of two large, high-power motors may permit very fast shifting. Additionally, when those motors are not being operated "differentially" to shift the transmission ratio, the full power of the two motors may be used to drive the output. Thus, the differential configuration allows for rapid, controllable high-power shifting without requiring a large, high-power motor (and its attendant size, weight, and cost) to be allocated for shifting alone. Additionally, the differential shifter embodiments described herein may be configured to be back-drivable or otherwise configured to permit energy (e.g., torques) received from the output to assist in effecting transmission ratio shifts, further increasing the efficiency of the transmissions.

FIGS. 10A-D and 12-14 illustrate embodiments in which a differential shifter receives two inputs, which may either extend in opposite directions from the differential/split pulley or that may be coaxial and concentric, with one input disposed at least partially within the other (e.g., one input shaft disposed within a hollow center of the other). In other embodiments, the inputs need not be nested in such a manner. These transmission ratio shifting mechanisms may be applied to effect axial separation and/or eccentricity changes for the "inner" or "outer" split pulleys of a nested-pulley differential (e.g., the nested-pulley transmissions having a single inner split pulley of FIG. 8 or 9A-C or the transmission of FIGS. 10A-D having multiple inner split pulleys), or the split pulleys of a variable transmission configured in some other manner (e.g., the variable transmission of FIGS. 7A-7D). These illustrated embodiments are intended as non-limiting examples; any embodiment which illustrates nested inputs may, with appropriate modification, receive inputs extending in opposite directions from the differential, or vice versa.

Further, a transmission as described herein, or an element thereof (e.g., a differential) may include additional or alternative elements to facilitate an application. For example, a transmission may include additional gearing to, e.g., provide a rotation on a different axis, to provide a gear reduction, to distribute a differential and/or shifting force amongst multiple inner split pulleys, or to provide some other mechanical effect. These modifications may be provided to, e.g., control a relationship between the differential torque and the applied transmission ratio-shifting force, to asymmetrically apportion energy from each of the two inputs toward transmission ratio-shifting and/or output driving, to control a mechanical advantage in shifting and/or output driving to one or both inputs, to convert a rotational motion into a linear motion (e.g., to exert an axial force between half-pulleys of a conical split pulley), to control the axial distance between half-pulleys of multiple split pulleys in common, or to provide some other benefit according to an application.

A. Ring Gear Differential Shifter

In some examples, an epicyclic differential could be provided in order to effect a differential shifter as described herein. Planet gears of the epicyclic differential may then be coupled to screws, toothed pins, linear gears or racks, or other mechanical elements so as to couple rotation of the planet gears (as a result of differential rotation of the inputs to the differential) into an axial force/movement between the half-pulleys of a split pulley. In some examples, the half-pulleys could be threaded into each other, and the rotation of the planet gears could be coupled into a relative rotation between the two half-pulleys, effecting a change in the axial distance between the half-pulleys via the threads coupling the half-pulleys together.

Figure 12A:
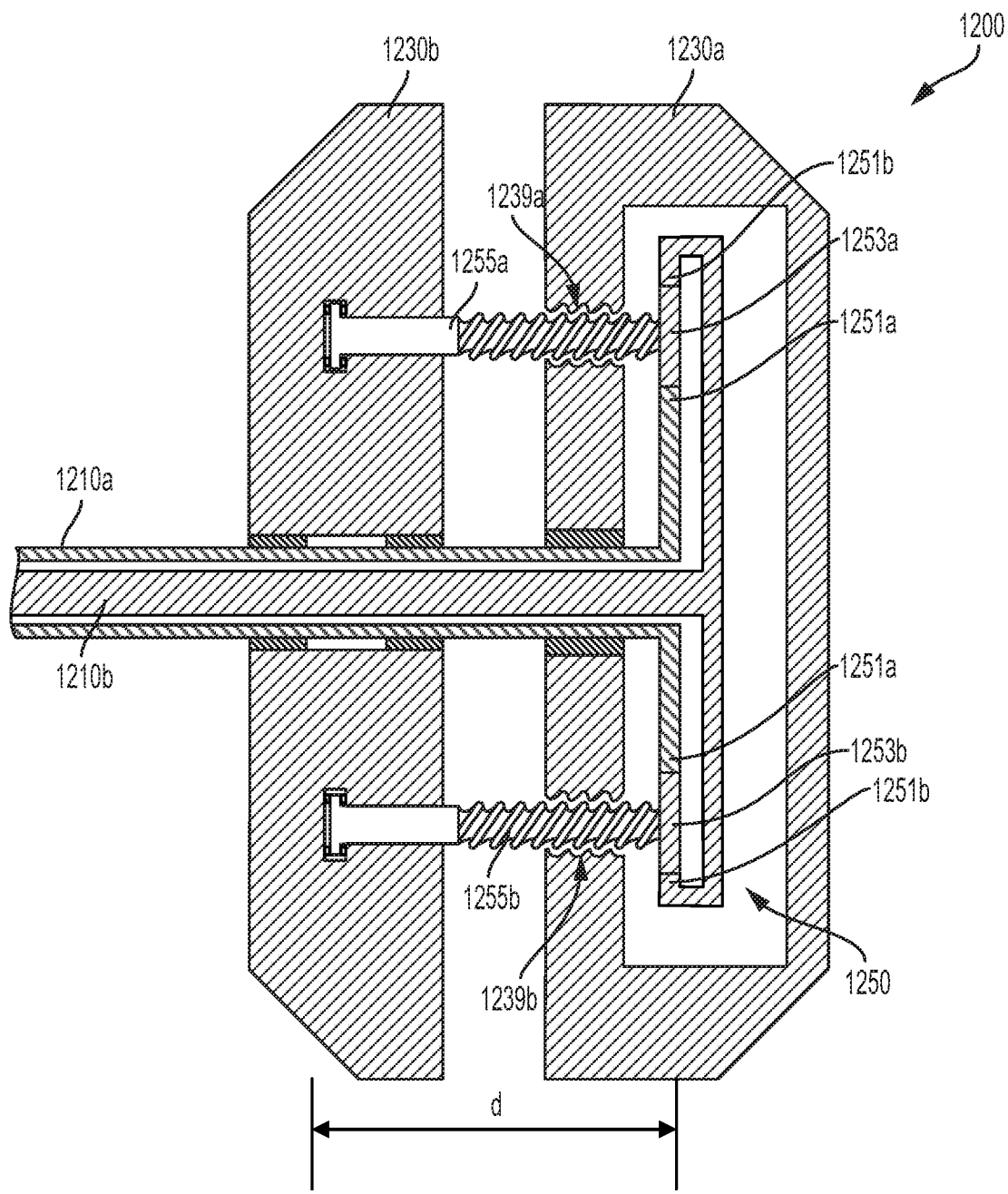
FIG. 12A is a cross-sectional view of an example shifting mechanism of a variable transmission.
Figure 12B:
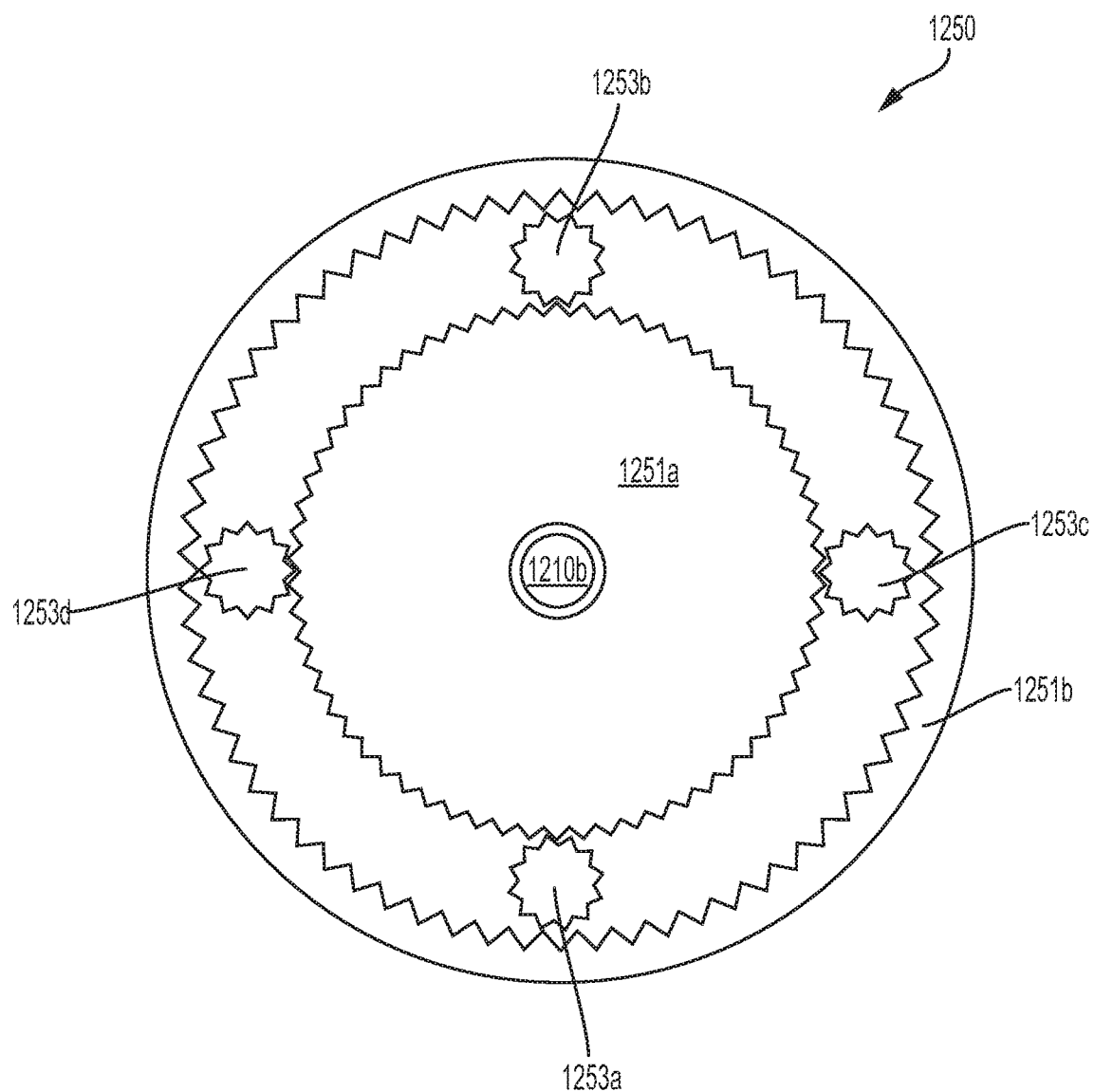
FIG. 12B is a schematic illustration of elements of the example shifting mechanism shown in FIG. 12A.

FIG. 12A illustrates, in cross-section, an example split pulley 1200 (e.g., a split pulley of a variable transmission) that includes an epicyclic differential 1250 coupled to two input members 1210a, 1210b and to two half pulleys 1230a, 1230b such that a torque difference between the first input member 1210a and the second input member 1210b causes an axial force to be applied, via the differential 1250, between the first half-pulley 1230a and the second half-pulley 1230b, thus allowing an axial distance ("d") between the first half-pulley 1230a and the second half-pulley 1230b to increase or decrease. The first 1210a and second 1210b input members are coaxial and concentric, and the first input member 1210a is disposed partially within the second input member 1210b. FIG. 12B shows another cross-sectional view of the differential 1250, the view in FIG. 12B being perpendicular to the cross-sectional view provided in FIG. 12A.

The differential 1250 includes a sun gear 1251a and a ring gear 1251b. The sun gear 1251a and the ring gear 1251b are coupled (e.g., fused) to the first 1210a and second 1210b input members, respectively, such that rotation of an input member results in rotation of a respective one of the sun gear and the ring gear. The differential 1250 additionally includes planet gears 1253a, 1253b, 1253c, 1253d that engage with the sun gear 1251a and ring gear 1251b such that a difference in rotation between the first 1210a and second 1210b input members results in rotation of the planet gears 1253a, 1253b, 1253c, 1253d relative to a planet carrier of the differential 1250 (not shown).

Rotation of one or more of the planet gears 1253a, 1253b, 1253c, 1253d may be coupled into an axial force/motion between the half-pulleys 1230a, 1230b in a variety of ways. As shown, the planet gears 1253a, 1253b are coupled (e.g., fused) to respective screws 1255a, 1255b. The screws 1255a, 1255b, in turn, are coupled to the first half-pulley 1230a via respective threaded holes 1239a, 1239b such that rotation of the planet gears 1253a, 1253b, 1253c, 1253d results in rotation of the screws 1251, 1255b, thereby enabling a change in the axial distance ("d") between the half-pulleys 1230a, 1230b. Note that the illustrated threaded holes in FIG. 12A (1239a, 1239b) and elsewhere herein are intended as non-limiting examples of a threaded hole that can be used to engage with a screw in order to control the axial distance between elements of a transmission. Such a threaded hole may extend all the way through the particular element(s) in which it is formed (as shown in FIG. 12A) or the threaded hole may only extend partially through the particular element(s) (e.g., the threaded hole may be formed by tapping a blind hole drilled only partway through a particular element of a transmission).

A net torque provided by the first 1210a and second 1210b input members may be applied to the half-pulleys 1230a, 1230b, e.g., to drive a belt of a variable transmission and thus to drive an output of the variable transmission. Such a net torque may be coupled from the inputs to the half-pulleys via a housing of the differential 1250, via a force exerted by the screws 1255a, 1255b onto the half-pulleys, or via some other element(s) of the split pulley 1200.

Note that the embodiment shown in FIGS. 12A and 12B is intended only as a non-limiting example. Alternative embodiments are anticipated. For example, the differential 1250 could be disposed between the half-pulleys 1230a, 1230b and could extend additional screws, via respective threaded holes, from the planet gears to engage with threaded portions of the second half-pulley 1230a). This could enable axial motion of the half-pulleys 1230a, 1230b that is symmetric with respect to the planet gear(s) or other elements of the differential 1250. A diameter and/or number of teeth of the sun gear, the ring gear, and/or the planet gears could be specified to control a relationship between the differential torque and the applied transmission ratio-shifting force, to asymmetrically apportion energy from each of the two inputs toward transmission ratio-shifting and/or output driving, to control a mechanical advantage in shifting and/or output driving to one or both inputs, or to provide some other benefit according to an application. The example half-pulleys 1230a, 1230b are coupled, rotationally, to net rotation of the inputs 1210a, 1210b; however, the half-pulleys 1230a, 1230b could be coupled to the inputs 1210a, 1210b via respective cams and cam bearings to facilitate trochoidal motion of the half-pulleys 1230a, 1230b in response to net rotation of the input members 1210a, 1210b. In yet another example, the differential shifting mechanisms depicted in FIGS. 12A and 12B may be adapted to control, in common, the axial distance between the half-pulleys of multiple inner split pulleys of a balanced transmission as described herein.

B. Balanced Inner Pulley Differential Shifter

A variety of shifting mechanisms may be applied to control, in common, the effective diameter of multiple inner split pulleys of a nested-pulley transmission as described herein. This can include adapting a shifting mechanism of a single-inner-split-pulley transmission to control multiple inner split pulleys. For example, the differential mechanisms illustrated in FIGS. 12A and 12B to control the axial distance between half-pulleys of a single split pulley may be adapted to control the axial distances between the half-pulleys of multiple split pulleys.

Figure 13:
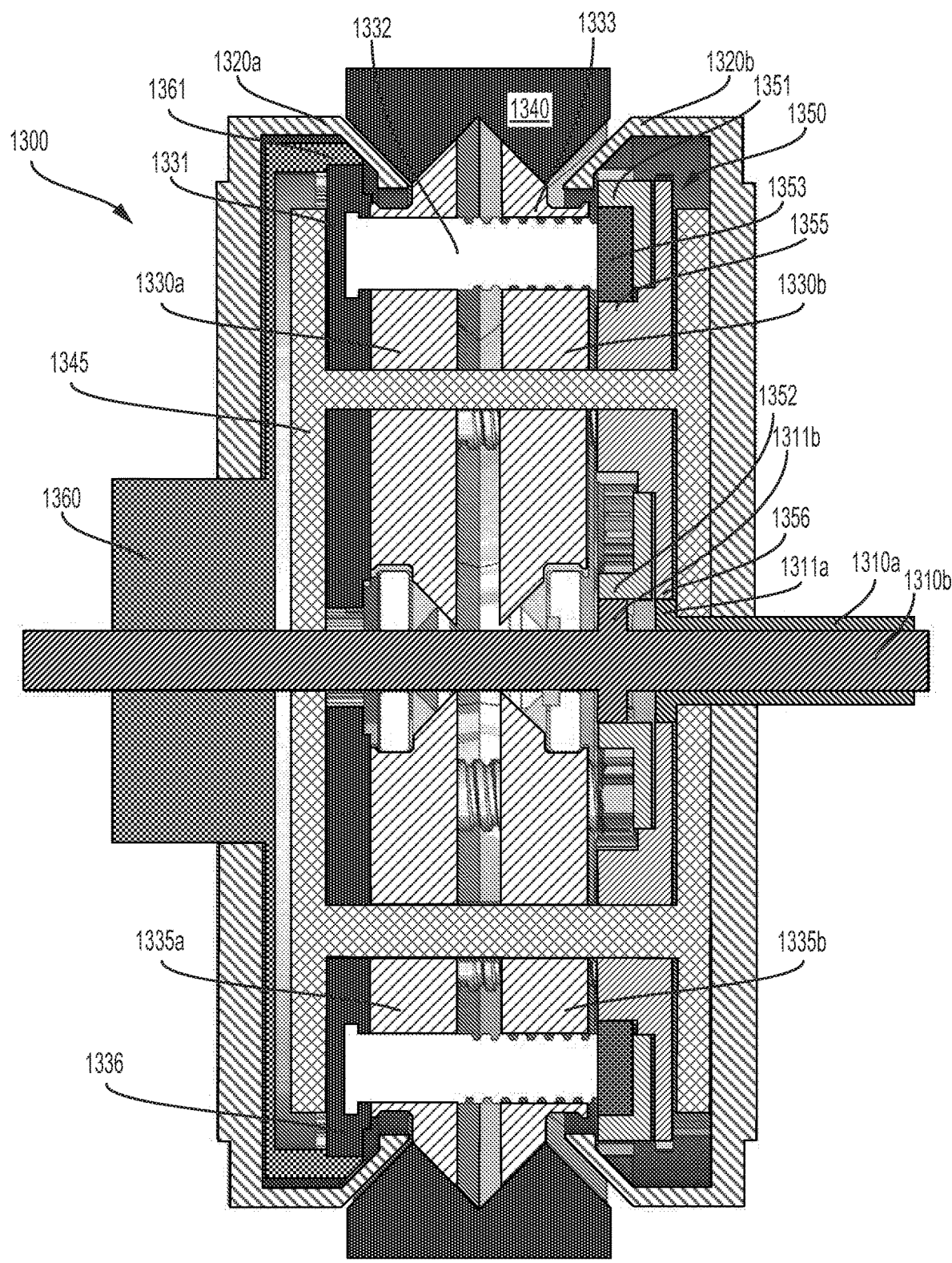
FIG. 13 is a cross-sectional view of an example shifting mechanism of a variable transmission.

As an example, FIG. 13 shows, in cross-section, a transmission 1300 that includes an outer split pulley having first 1320a and second 1320b half-pulleys, a first inner split pulley having first 1330a and second 1330b half-pulleys, and a second inner split pulley having first 1335a and second 1335b half-pulleys. The inner split pulleys are rotatably coupled (e.g., via ball bearings) to a planet carrier 1345. A belt 1340 is in contact with the outer split pulley and the inner split pulleys. The first half-pulleys 1330a, 1330b of the first and second inner split pulleys are coupled (e.g., fused, formed from a single piece of material, etc.) to respective first 1331 and second 1336 planet gears that are in geared contact with a ring gear 1361 that is coupled to an output member 1360. First 1310a and second 1310b inputs are coupled to the first and second inner split pulleys via respective differentials such that the input members 1310a, 1310b can be driven in common to realize a torque at the output member 1360 of the transmission 1300. The input members 1310a, 1310b can be driven differentially to effect a change in the transmission ratio of the transmission 1300 by adjusting the axial distances between the half-pulleys of the inner split pulleys.

A differential 1350 is coupled to the first inner split pulley to facilitate this control. The differential 1350 includes a sun gear 1355 and a ring gear 1351 that are in geared contact with a screw gear 1353. The screw gear 1353 is coupled (e.g., fused) to a screw 1332 that is in contact with threads 1333 of the second half-pulley 1330b of the first inner split pulley such that rotation of the screw 1332 relative to the first inner split pulley results in a change in the axial distance between the half-pulleys 1330a, 1330b of the first inner split pulley. Such rotation can be accomplished by relative rotation between the sun gear 1355 and the ring gear 1351 of the transmission 1351. The sun gear 1355 is coupled to a ring gear 1356 that is in geared contact with a sun gear 1311a that is coupled to the first input member 1310a. Thusly, rotation of the first input member 1310a can effect rotation of the sun gear 1355. The ring gear 1351 is coupled to another ring gear 1352 that is in geared contact with another sun gear 1311b that is coupled to the second input member 1310b. Thusly, rotation of the second input member 1310b can effect rotation of the ring gear 1351. Accordingly, differential rotation/torque between the first 1310a and second 1310b input members may effect a change in the axial distance between/exertion of an axial force between the half-pulleys 1330a, 1330b of the first inner split pulley. Additionally, net torque between the first 1310a and second 1310b input members may result in the realization of a torque at the output member 1360.

C. Balanced Inner Pulley Differential Shifter

In some examples, each inner split pulley of a transmission as described herein could be driven by first and second input members, e.g., via sun gears coupled to the first and second input members. The half-pulleys of each inner split pulley could be driven directly by the first input member while the half-pulley of each inner split pulley could be driven indirectly by a screw that engages, via threads, with at least one of the half-pulleys. Thus, a difference in rotation and/or torque between the input members could result, via the screw, in an axial force and/or change in distance between the half-pulleys of each of the inner split pulleys. Rotation and/or torque applied in common via the input members could be transmitted, via the split pulleys, through the transmission.

D. Threaded Cam Differential Shifter

In some examples, a differential could be provided that includes opposite-handed threaded portions (e.g., nuts, tapped holes, threads of a ball screw). The threaded portions could then be in contact with corresponding screws coupled to inputs of the differential. Accordingly, differential rotation of the inputs can cause axial motion/forces to be applied to a half-pulley in contact with the cam (as one screw screws into its corresponding threaded portion, the other screw unscrews from its corresponding threaded portion). In-common rotation of the inputs would result in a rotation of and/or an application of torque to the cam and/or the split pulley. The threaded portions could be rigidly coupled to each other (e.g., tapped from opposite direction into a single hole formed in the cam). Alternatively, the threaded portions could be formed in respective sub-portions (e.g., "sub-cams") of the cam, permitting relative motion between the threaded portions. Such sub-portions could be coupled via pins or other methodologies to permit relative axial motion between the sub-portions but to prevent relative rotation between the sub-portions. Such cams, screws, threaded portions, and associated elements could constitute a differential that applies differential torque between the inputs toward shifting the transmission ratio of a transmission (via axial motion of the cam) and that applies net torque toward an output torque of the transmission.

Figure 14:
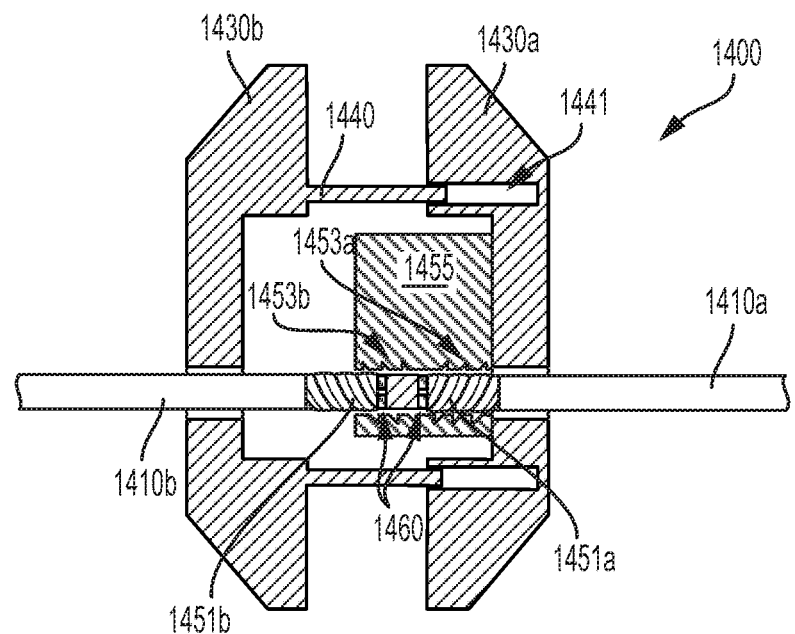
FIG. 14 is a cross-sectional view of an example shifting mechanism of a variable transmission.

FIG. 14 illustrates an example split pulley 1400 (e.g., a split pulley of a variable transmission) that includes a cam 1455 having first 1453a and second 1453b threaded portions (e.g., threads of respective ball screws). The threaded portions 1453a, 1453b have opposite handedness. The transmission 1400 additionally includes first 1430a and second 1430b half-pulleys. The second half-pulley 1430b includes pins 1440 that extend into respective holes 1441 of the first half-pulley 1430a. The pins 1440 allow the half-pulleys 1430a, 1430b to translate axially relative to each other but prevent relative rotation between the half-pulleys 1430a, 1430b (and thus may be employed to transmit torque from the input members 1410a, 1410b to the second half-pulley 1430b). The first half-pulley 1430a is rigidly coupled to the cam 1455. Two input members 1410a, 1410b are coupled to respective screws 1451a, 1451b that are, themselves, engaged with respective threaded portions 1453a, 1453b of the cam 1455 such that a torque difference between the first input member 1410a and the second input member 1410b causes an axial force to be applied between the cam 1455 and the first half-pulley 1430a. A thrust bearing 1460 is provided to allow the first 1451a and second 1451b screws to exert axial forces on each other so as to effect the generation of the axial force between the cam 1455 and the first half-pulley. Such an axial force may thus allow an axial distance ("d") between the first half-pulley 1430a and the second half-pulley 1430b to increase or decrease. The first 1410a and second 1410b input members extend outward from the half-pulleys 1430a, 1430b in opposite directions.

A net torque provided by the first 1410a and second 1410b input members may be applied to the half-pulleys 1430a, 1430b, e.g., to drive a belt of a variable transmission and thus to drive an output of the variable transmission. Such a net torque may be coupled from the inputs to the half-pulleys via the cam 1455, via the pins 1440, and/or some other element(s) of the split pulley 1400.

Note that the arrangement of the cam 1455, screws 1451a, 1451b, and half-pulleys 1430a, 1430b as shown in FIG. 14 is intended as a non-limiting example of a mechanism that uses such a doubly-threaded cam to effect control of the axial distance between first and second half-pulleys of a conical (or otherwise configured) split pulley. In another example, the cam could be provided as first and second sub-cams, having respective first and second opposite-handedness threaded portions. The sub-cams could be rigidly coupled to respective half-pulleys 1430a, 1430b and coupled to each other via pins or other methodologies to permit relative axial motion between the sub-portions (and between the half-pulleys) but to prevent relative rotation between the sub-portions.

Note that the embodiment shown in FIG. 14 is intended only as a non-limiting example. Alternative embodiments are anticipated. The example half-pulleys 1430a, 1430b are rigidly coupled, rotationally, to the cam 1455 (and thus to net rotation of the inputs 1410a, 1410b); however, the half-pulleys 1430a, 1430b could be coupled to the inputs 1410a, 1410b and/or the cam 1455 via respective additional cams and/or cam bearings to facilitate trochoidal motion of the half-pulleys 1430a, 1430b in response to net rotation of the input members 1410a, 1410b. Additionally or alternatively, the half-pulleys 1430a, 1430b could be driven by input members that rotate about an axis in common with the half-pulleys 1430a, 1430b. A pitch, lead, number of threads, and/or other properties of the screws 1451a, 1451b could be specified to control a relationship between the differential torque and the applied transmission ratio-shifting force, to asymmetrically apportion energy from each of the two inputs toward transmission ratio-shifting and/or output driving, to control a mechanical advantage in shifting and/or output driving to one or both inputs, or to provide some other benefit according to an application.

In yet another example, the differential shifting mechanisms depicted in FIG. 14 may be adapted to control, in common, the axial distance between the half-pulleys of multiple inner split pulleys of a balanced transmission as described herein (e.g., using mechanisms similar to those illustrated in FIG. 13). For example, each of the first 1410a and second 1410b input members may be coupled to respective planet gears in respective planetary differentials whose respective sun gears, rings gears, and/or planet carriers are being driven by respective first and second overall inputs to the transmission.

Note that, while the embodiments of FIGS. 12-14 depict split-pulleys having inward- and outward-facing contact surfaces that are in contact with outward- and inward-facing context surfaces, respectively, of w-shaped belts, the mechanisms of FIGS. 12-14 may be applied in other contexts. For example, the embodiments of FIGS. 12-14 could be modified to control the axial distance between half-pulleys of a split pulley having only inward-facing contact surfaces. Such inward-facing contact surfaces could be in contact with inward-facing contact surfaces of a belt. Such a belt could be a v-shaped belt or configured in some other manner to additionally have outward-faces contact surfaces configured to contact the outward-facing contact surfaces of the half-pulleys of a further split pulley.

IV. ADDITIONAL SHIFTING MECHANISMS

The example shifting mechanisms illustrated in FIGS. 12-14 and described above incorporate elements configured as a differential in order to provide, from a difference in torque between two inputs, a axially-directed shifting force between opposite half-pulleys of one or more conical (or otherwise configured) split pulleys. However, other, non-differential mechanisms are also anticipated to permit rapid, controllable shifting of the transmission ratio of a split pulley variable transmission. For example, a first input could be provided that is coupled to a split pulley such that torque applied via the first input is applied, via the split pulley, to an output of the transmission (e.g., via a v-belt, a w-belt, or some otherwise-configured belt). A second input is also provided via which torque may be exerted to effect shifting of the transmission. In such an example, the shifting of the transmission ratio could be related to a relative rotation between the two inputs, and substantially unrelated to any difference in torque between the two inputs. In such an example, the second input could rotate at the same rate as the first input, with substantially no torque applied, to maintain the transmission ratio at a particular value. In such an example, the second input could be actively driven to match the speed of the first input. Alternatively, the second input could be decoupled from whatever motor is used to drive the second input in order to maintain the transmission ratio at a particular value. In yet another embodiment, the second input could be coupled to a drive motor (e.g., to a drive motor used to drive the first input) via a clutch, such that the drive motor could operate to effect shifting of the transmission ratio when the drive motor is coupled, via the clutch, to the second input.

Figure 15:
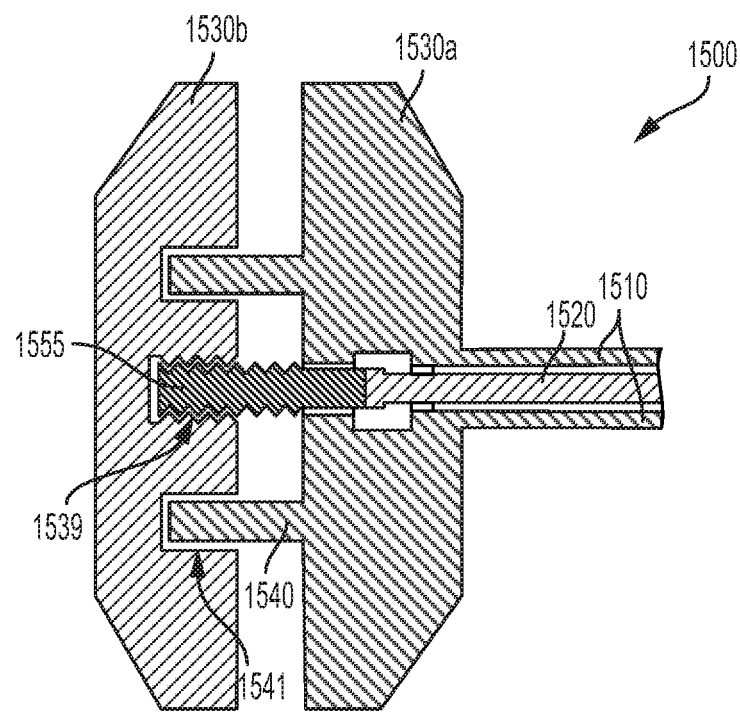
FIG. 15 is a cross-sectional view of an example shifting mechanism of a variable transmission.

FIG. 15 illustrates, in cross-section, an example of a split pulley 1500 of such a transmission. The split pulley 1500 includes two half pulleys 1530a, 1530b and two input members 1510, 1520. The first input member 1510 is coupled to at least one of the half-pulleys 1530a, 1530b such that a torque applied to the first input member 1510a is transmitted to the first 1530a and second 1530b half-pulleys. The first half-pulley 1530a includes pins 1540 that extend into respective holes 1541 of the second half-pulley 1530b. The pins 1540 allow the half-pulleys 1530a, 1530b to translate axially relative to each other but prevent relative rotation between the half-pulleys 1530a, 1530b (and thus may be employed to transmit torque from the first input member 1510 to the second half-pulley 1530b).

A second input member 1520 is coupled to a screw 1555. The first 1510 and second 1520 input members are coaxial and concentric, and the second input member 1520 is disposed partially within the first input member 1510. Accordingly, differential rotation between the first input member 1510 and the second input member 1520 can result in rotation of the screw 1555. The screw 1555 engages with a threaded portion 1539 of the second half-pulley 1530b such that differential rotation between the first input member 1510 and the second input member 1520 results in an axial force being applied, via the screw 1555, between the first half-pulley 1530a and the second half-pulley 1530b, thus allowing an axial distance between the first half-pulley 1530a and the second half-pulley 1530b to increase or decrease.

Note that the embodiment shown in FIG. 15 is intended only as a non-limiting example. Alternative embodiments are anticipated. For example, a different mechanism (e.g., a rack, a linear gear, a threaded coupling between the half-pulleys) could be used to translate differential rotation between the first 1510 and second 1520 input members into an axial motion between the half-pulleys 1530a, 1530b. Multiple screws could be included, each driven by the second input (e.g., via one or more gears) to translate rotation of the second input 1520 into an axial force/motion between the half-pulleys. The example half-pulleys 1530a, 1530b are rigidly coupled, rotationally, to rotation of the first input member 1510; however, the half-pulleys 1530a, 1530b could be coupled to the first input 1510 via respective cams and cam bearings to facilitate trochoidal motion of the half-pulleys 1530a, 1530b in response to rotation of the first input member 1510. In yet another example, the input members for the illustrated split pulley 1500 could be coupled, via a planetary gearset or via some other mechanism, to input members used to drive multiple such split pulleys arranged, e.g., in a balanced arrangement as described elsewhere herein in order to adjust the axial distances of each of the multiple split pulleys in common.

Figure 16:
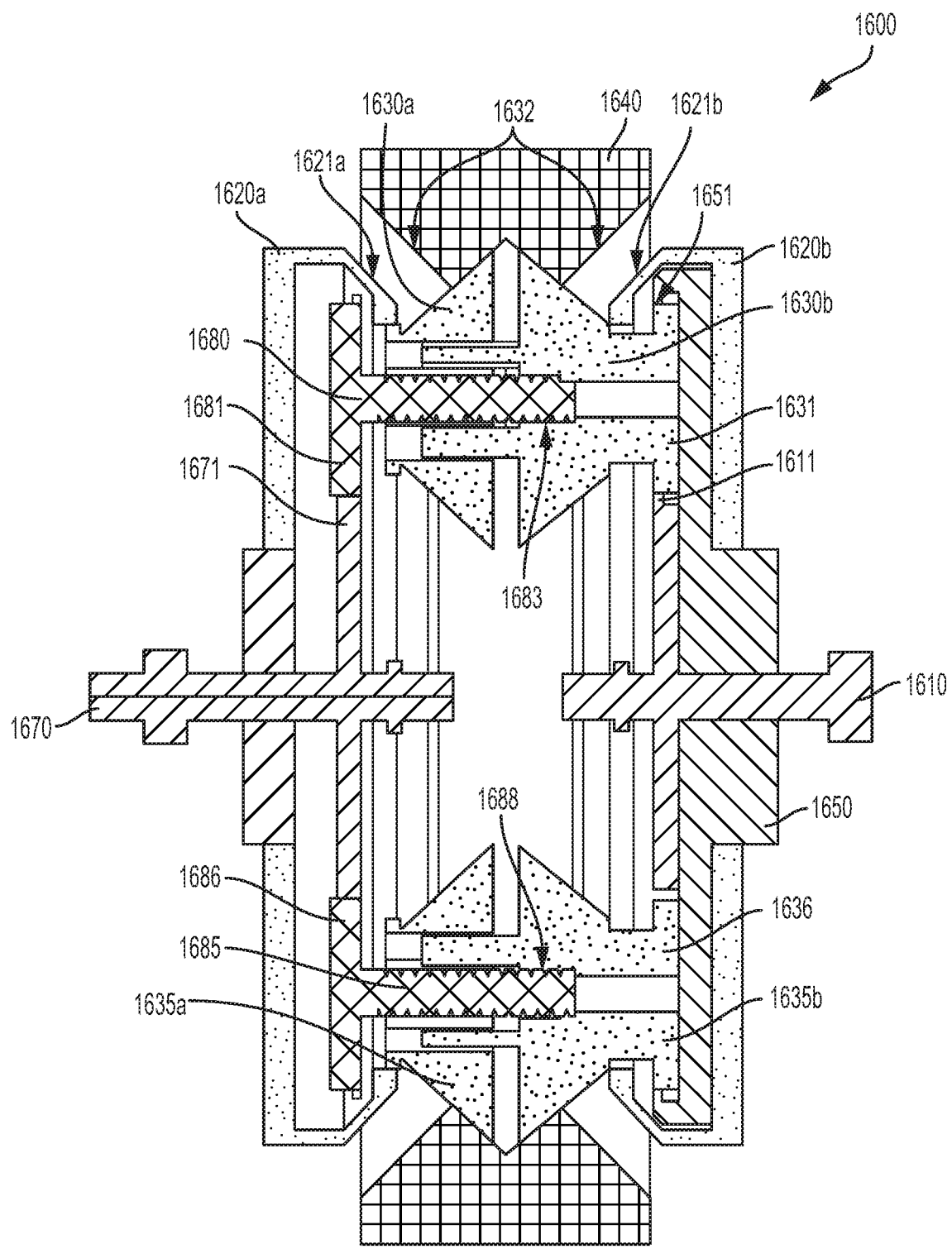
FIG. 16 is a cross-sectional view of an example shifting mechanism of a variable transmission.

In yet another example, the shifting mechanisms depicted in FIG. 15 may be adapted to control, in common, the axial distance between the half-pulleys of multiple inner split pulleys of a balanced transmission as described herein. FIG. 16 illustrates, in cross-section, such a transmission 1600. The transmission 1600 includes first 1620a and second 1620b half-pulleys of an outer split pulley that have respective bearing surfaces 1621a, 1621b via which the outer split pulley contacts a belt 1640. The transmission 1600 also includes two inner split pulleys. The first inner split pulley includes first 1630a and second 1630b half-pulleys that have respective bearing surfaces 1632 via which the first inner split pulley contacts the belt 1640. The second inner split pulley includes first 1635a and second 1635b half-pulleys. The half-pulleys of each inner split pulley are rotationally locked to each other (e.g., via matching pins and depressions) such a driving torque applied to one of the half-pulleys of a particular inner split pulley (e.g., via a planet gear fused to the half-pulley) is also applied to the other half-pulley of the particular inner split pulley. The first and second inner split pulleys are coupled to respective first 1631 and second 1636 planet gears that are in geared contact with a central sun gear 1611 and an outer ring gear 1651 that is coaxial with the sun gear. The first and second inner split pulleys are maintained in an opposite, balanced arrangement within the transmission 1600 by a planet carrier (not shown) or via some other means (e.g., via forces applied by the sun 1611 and ring 1651 gears).

The transmission 1600 has a first input member 1610 that is coupled to the sun gear and an output member 1650 that is coupled to the ring gear 1651. The half-pulleys 1620a, 1620b of the outer split pulley are mechanically grounded to prevent rotation. Accordingly, rotations and/or torques may be transmitted between the first input member 1610 and the output member 1650 via the inner split pulleys according to a transmission ratio that is controllable by adjusting the axial distances between the half-pulleys of the outer split pulley and the inner split pulleys. Note that this configuration is intended as a non-limiting example embodiment; the transmission 1600 could, alternatively, have inputs and outputs coupled to the sun gear 1611, ring gear 1651, a planet carrier (not shown), and/or the outer split pulley 1620a, 1620b with appropriate alternative elements of the transmission 1600 rotationally grounded. For example, the ring gear 1651 could be grounded and the outer split pulley 1620a, 1620b could be allowed to rotate. In such an example, an output member could be coupled to the outer split pulley 1620a, 1620b and rotations and/or torques could be transmitted from the input member 1610 to the output member that is coupled to the outer split pulley 1620a, 1620b via the transmission 1600.

The transmission ratio of the transmission 1600 is controllable by adjusting the axial distances between the half-pulleys of the outer split pulley and the inner split pulleys. Adjustment of the axial distances between the half-pulleys of the inner split pulleys can be accomplished by applying a differential rotation to a second input member 1670 relative to the rotation of the first input member 1610. The first half-pulley 1630a of the first inner split pulley is coupled to a first screw 1680 that is in contact with a threaded portion 1683 of the second half-pulley 1630b of the first inner split pulley such that rotation of the first screw 1680 relative to the threaded portion 1683 of the second half-pulley 1630b results in at least one of a force or a change in the axial distance between the half-pulleys 1630a, 1630b of the first inner split pulley. Similarly, the first half-pulley 1635a of the second inner split pulley is coupled to a second screw 1685 that is in contact with a threaded portion 1688 of the second half-pulley 1635b of the second inner split pulley such that rotation of the second screw 1685 relative to the threaded portion 1688 of the second half-pulley 1635b results in at least one of a force or a change in the axial distance between the half-pulleys 1635a, 1635b of the second inner split pulley.

The first 1680 and second 1685 screws are coupled to respective first 1681 and second 1686 gears that are in geared contact with a sun gear 1671 that is coupled to the second input member 1670. Accordingly, relative rotation between the first input member 1610 and the second input member 1670 results in rotation of the screws 1680, 1685 relative to the respective inner split pulleys. Thus, this relative rotation allows the axial distance between the half-pulleys of the inner split pulleys to be controlled, thereby allowing the transmission ratio of the transmission 1600 to be controlled. The axial distance between the half-pulleys 1620a, 1620b of the outer split pulley can be controlled by another active mechanism (not shown). Additionally or alternatively, the axial distance between the half-pulleys 1620a, 1620b of the outer split pulley can be passively controlled by a spring or other elastic element coupled between the half-pulleys 1620a, 1620b of the outer split pulley.

Note that the embodiment shown in FIG. 16 is intended only as a non-limiting example. Alternative embodiments are anticipated. For example, a different mechanism (e.g., a rack, a linear gear, a threaded coupling between the half-pulleys) could be used to translate differential rotation between the first 1610 and second 1670 input members into an axial motion between the half-pulleys of the first and second split pulleys. The example half-pulleys of each inner split pulley may be coupled, rotationally, to rotation of their respective planet gears 1631, 1636. In some examples, the second input member 1670 could interface with the screw gears 1681, 1686 via a ring gear.

Note that, while the embodiments of FIGS. 15 and 16 depict split-pulleys having inward- and outward-facing contact surfaces that are in contact with outward- and inward-facing context surfaces, respectively, of w-shaped belts, the mechanisms of FIGS. 15 and 16 may be applied in other contexts. For example, the embodiments of FIGS. 15 and 16 could be modified to control the axial distance between half-pulleys of split pulleys having only inward-facing contact surfaces. Such inward-facing contact surfaces could be in contact with outward-facing contact surfaces of a belt. Such a belt could be a v-shaped belt or configured in some other manner.

V. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

In particular, note that embodiments herein may be driven by inputs which extend outward from a split pulley (or other driven element(s)) in opposite directions or by inputs which extend in the same direction (e.g., inputs which are coaxial and which are nested within one another). Additionally, the embodiments illustrated herein which provide for the control of an axial separation between half-pulleys of a split pulley may receive inputs that are coaxial with a rotational and/or geometrical axis of the split pulley (e.g., that are coaxial with an axis of rotation of a conical bearing surface of the half-pulley(s)). Alternatively, such embodiments may receive inputs that are not coaxial with a rotational and/or geometrical axis of the split pulley (e.g., the input(s) may drive the split pulley via one or more cams, via sun, ring, or other varieties of gearing, via belts, or via some other means, to enable driving the split pulley according to a nested transmission configuration or to facilitate some other application).

What is claimed is:

1. A transmission having a reduced size, the transmission comprising:
   an outer conical pulley;
   an inner conical pulley;
   a belt, wherein the belt has first and second outward-facing contact surfaces and first and second inward-facing contact surfaces, wherein the belt is in contact with the outer conical pulley via the first and second outward-facing contact surfaces, wherein the belt is in contact with the inner conical pulley via the first and second inward-facing contact surfaces, wherein the belt is capable of sustaining compression forces between the first and second outward-facing contact surfaces, and wherein the belt is capable of sustaining tension forces between the first and second inward-facing contact surfaces;
   a first input member; and
   a first output member coupled to the first input member via the inner conical pulley such that torque can be transmitted between the first input member and the first output member.

2. The transmission of claim 1, wherein the inner conical pulley is nested within the outer conical pulley.

3. The transmission of claim 1, wherein the belt comprises a plurality of belt segments and wherein each belt segment of the plurality of belt segments comprises a respective portion of each of the first and second inward-facing contact surfaces and each of the first and second outward-facing contact surfaces.

4. The transmission of claim 3, wherein the belt is configured as a push belt.

5. The transmission of claim 3, wherein the belt further comprises a band to which each of the segments is coupled, wherein each of the segments is capable of transmitting forces between the band and either of the outer conical pulley or the inner conical pulley, and wherein at least a portion of the band is in tension.

6. The transmission of claim 3, wherein the belt is configured as a chain link belt, with each of the belt segments forming a link the chain of the chain link belt.

7. The transmission of claim 1, further comprising:
   a differential coupled to the inner conical pulleys, wherein the first output member is coupled to each of the inner conical pulleys via the differential.

8. The transmission of claim 1, wherein the outer conical pulley is coupled to a mechanical ground such that the outer conical pulley is prevented from rotating.

9. The transmission of claim 1, wherein the inner conical pulley is a split pulley having a first half-pulley and a second half-pulley, and wherein the first half-pulley and the second half-pulley of the inner conical pulley are coupled to each other via an elastic element such that an axial force is exerted between the first half-pulley and the second half-pulley of the inner conical pulley by the elastic element.

10. A transmission having a reduced size and a controllable transmission ratio for increased efficiency, the transmission comprising:
    an outer conical split pulley having a first half-pulley and a second half-pulley;
    an inner conical split pulley having a first half-pulley and a second half-pulley;
    a belt, wherein the belt has first and second outward-facing contact surfaces and first and second inward-facing contact surfaces, wherein the belt is in contact with the first and second half-pulleys of the outer conical split pulley via the first and second outward-facing contact surfaces, respectively, and wherein the belt is in contact with the first and second half-pulleys of the inner conical split pulley via the first and second inward-facing contact surfaces, respectively;
    a first input member; and
    a first output member coupled to the first input member via the inner conical split pulley such that torque can be transmitted between the first input member and the first output member.

11. The transmission of claim 10, wherein the inner conical split pulley is nested within the outer conical split pulley.

12. The transmission of claim 10, wherein the belt comprises a plurality of belt segments and wherein each belt segment of the plurality of belt segments comprises a respective portion of each of the first and second inward-facing contact surfaces and each of the first and second outward-facing contact surfaces.

13. A variable transmission comprising:
    an input member that rotates about a central axis;
    an inner pulley that rotates about an inner pulley axis, wherein an eccentricity of the rotation of the inner pulley, relative to the central axis, is adjustable to control a transmission ratio of the transmission;
    an outer conical split pulley having a first half-pulley and a second half-pulley;
    a belt, wherein the belt is in contact with the inner pulley, and wherein the belt is in contact with the first and second half pulleys of the outer conical split pulley via respective first and second contact surfaces of the belt; and
    an output member, wherein the output member is coupled to the inner pulley such that precession of the inner pulley axis around the central axis results in rotation of the output member.

14. The variable transmission of claim 13, wherein the belt comprises teeth, wherein the inner pulley comprises a sprocket, and wherein the belt is in toothed contact with the sprocket.

15. The variable transmission of claim 13, wherein at least one of the first half-pulley or the second half-pulley is rotationally grounded.

16. The variable transmission of claim 13, wherein at least one of the first half-pulley or the second half-pulley is coupled to the input member such that rotation of the input member can result in rotation of the at least one of the first half-pulley or the second half-pulley.

17. The variable transmission of claim 16, wherein the at least one of the first half-pulley or the second half-pulley is coupled to the input member via two or more planetary gears of a planetary gearset.

18. The variable transmission of claim 13, further comprising a controllable-eccentricity cam, wherein the inner pulley rotates about the controllable-eccentricity cam, and wherein adjusting the eccentricity of the rotation of the inner pulley relative to the central axis comprises adjusting a distance between a center of the controllable-eccentricity cam and the central axis.

19. The variable transmission of claim 13, further comprising an idler gear, wherein the inner pulley comprises an inner ring gear that is coupled to the idler gear such that rotation of the input member can result in rotation of the inner pulley via rotation of the idler gear.

20. The variable transmission of claim 19, further comprising a controllable-eccentricity cam, wherein the inner pulley rotates about the controllable-eccentricity cam, and wherein adjusting the eccentricity of the rotation of the inner pulley relative to the central axis comprises rotating the controllable-eccentricity cam about an axis of rotation of the idler gear such that a distance between a center of the controllable-eccentricity cam and the central axis is adjusted.

* * * * *